(12) United States Patent
Bai et al.

(10) Patent No.: US 10,803,328 B1
(45) Date of Patent: Oct. 13, 2020

(54) SEMANTIC AND INSTANCE SEGMENTATION

(71) Applicant: UATC, LLC, San Francisco, CA (US)

(72) Inventors: Min Bai, Toronto (CA); Raquel Urtasun, Toronto (CA)

(73) Assignee: UATC, LLC, San Francisco, CA (US)

(*) Notice: Subject to any disclaimer, the term of this patent is extended or adjusted under 35 U.S.C. 154(b) by 106 days.

(21) Appl. No.: 16/123,147

(22) Filed: Sep. 6, 2018

Related U.S. Application Data

(60) Provisional application No. 62/586,564, filed on Nov. 15, 2017.

(51) Int. Cl.
*G06N 3/08* (2006.01)
*G06T 7/168* (2017.01)
*G06K 9/00* (2006.01)
*G06N 5/04* (2006.01)

(52) U.S. Cl.
CPC .......... *G06K 9/00805* (2013.01); *G06N 3/08* (2013.01); *G06N 5/046* (2013.01); *G06T 7/168* (2017.01)

(58) Field of Classification Search
CPC combination set(s) only.
See application file for complete search history.

(56) References Cited

U.S. PATENT DOCUMENTS

| | | | | |
|---|---|---|---|---|
| 2016/0188954 A1* | 6/2016 | Ajemba | ................ | G06T 7/0012 382/128 |
| 2018/0232947 A1* | 8/2018 | Nehmadi | ................ | G01S 13/89 |
| 2018/0260793 A1* | 9/2018 | Li | ................ | G06Q 30/0283 |
| 2018/0348374 A1* | 12/2018 | Laddha | ................ | G01S 7/4808 |
| 2019/0180502 A1* | 6/2019 | England | ................ | G01S 13/89 |
| 2019/0354782 A1* | 11/2019 | Kee | ................ | G06N 3/0454 |
| 2019/0391578 A1* | 12/2019 | Tariq | ................ | G06N 3/08 |

OTHER PUBLICATIONS

Ziyu Zhang, Monocular Object Instance Segmentation and Depth Ordering with CNNs,, Dec. 7-13, 2015, pp. 1-8.*
Arbalaez et al., "Multiscale Combinatorial Grouping", Computer Vision and Pattern Recognition, Columbus, Ohio, Jun. 23-28, 2014, pp. 328-335.

(Continued)

*Primary Examiner* — Omar S Ismail
(74) *Attorney, Agent, or Firm* — Dority & Manning, PA

(57) ABSTRACT

Systems and methods for detecting objects are provided. In one example, a computer-implemented method includes receiving sensor data from one or more sensors configured to generate sensor data. The method includes inputting the sensor data to a machine-learned model that generates a class prediction and an instance prediction for each of a plurality of portions of the sensor data. The instance prediction includes an energy value based on a distance to at least one object boundary. The machine learned model can be trained to generate a common energy value to represent the at least one object boundary. The method includes generating as outputs of the machine-learned model, an instance prediction and a class prediction corresponding to each of the plurality of portions of the sensor data. The method includes generating one or more object segments based at least in part on the instance predictions and the class predictions.

16 Claims, 13 Drawing Sheets

(56) References Cited

OTHER PUBLICATIONS

Arnab et al., "Bottom-Up Instance Segmentation Using Deep Higher-Order CRFs", British Machine Vision Conference, York, United Kingdom, Sep. 19-22, 2016, 12 pages.

Bai et al., "Deep Watershed Transform for Instance Segmentation", arXiv:1611.08303v2, May 4, 2017, 9 pages.

Beucher et al., "Use of Watersheds in Contour Detection", Proceedings of the International Workshop on Image Processing, Real-Time Edge and Motion Detection/Estimation, Rennes, France, Sep. 17-21, 1979, 12 pages.

Chen, et al. "Multi-Instance Object Segmentation with Occlusion Handling", CVPR, 2015, 9 pages.

Cordts et al., "The Cityscapes Dataset for Semantic Urban Scene Understanding", Computer Vision and Pattern Recognition, Las Vegas, Nevada, Jun. 26-Jul. 1, 2016, 11 pages.

Dai et al., "Instance-Aware Semantic Segmentation Via Multi-Task Network cascades", Computer Vision and Pattern Recognition, Las Vegas, Nevada, Jun. 26-Jul. 1, 2016, 9 pages.

Dokladal et al., "Segmentation of 3D Head MR Images Using Morphological Reconstruction Under Constraints and Automatic Selection of Markers", International Conference on Image Processing, Thessaloniki, Greece, Oct. 7-10, 2001, pp. 1075-1078.

Everingham et al., "The PASCAL Visual Object Classes Challenge 2012 (VOC2012) Results", http://www.pascal-network.org/challenges/VOC/voc2012/workshop/index.html, retrieved on Sep. 18, 2018, 14 pages.

Ghiasi et al., "Laplacian Pyramid Reconstruction and Refinement for Semantic Segmentation", arXiv:1605.02264v2, Jul. 30, 2016, 16 pages.

Glorot et al., "Understanding the Difficulty of Training Deep Feedforward Neural Networks", International Conference on Artificial Intelligence and Statistics, Sardinia, Italy, May 13-15, 2010, 8 pages.

Grau et al., "Improved Watershed Transform for Medical Image Segmentation Using Prior Information", IEEE Transactions on Medical Imaging, vol. 23, Issue 4, 2004, pp. 447-458.

Hariharan et al., "Simultaneous Detection and Segmentation", European Conference on Computer Vision, Zurich, Switzerland, Sep. 6-12, 2014, pp. 297-312.

Li et al., "Iterative Instance Segmentation", Computer Vision and Pattern Recognition, Las Vegas, Nevada, Jun. 26-Jul. 1, 2016, 9 pages.

Liang et al., "Proposal-Free Network for Instance-Level Object Segementation", arXiv:1509.02636v2, Sep. 10, 2015, 14 pages.

Liang et al., "Reversible Recursive Instance-Level Object Segmentation", Computer Vision and Pattern Recognition, Los Vegas, Nevada, Jun. 26-Jul. 1, 2016, 9 pages.

Long et al., "Fully Convolutional Networks for Semantic Segmentation", Computer Vision and Pattern Recognition, Boston, Massachusetts, Jul. 8-10, 2015, 10 pages.

Martin et al., "A Database of Human Segmented Natural Images and Its Application to Evaluating Segmentation Algorithms and Measuring Ecological Statistics", International Conference on Computer Vision, Vancouver, Canada, Jul. 7-4, 2011 pages.

Meyer, "The Watershed Concept and its use in Segmentation: A Brief History", arXiv:1202.0216v1, Feb. 1, 2012, 11 pages.

Minervini et al., "Finely-Grained Annotated Datasets for Image-Based Plant Phenotyping", Pattern Recognition Letters, vol. 81, 2015, pp. 80-89.

Pinheiro et al., "Learning to Refine Object Segments", arXiv:1603.08695v2, Jul. 26, 2016, 18 pages.

Pinheiro et al., "Learning to Segment Object Candidates", Conference on Neural Information Processing Systems, Istanbul, Turkey, Nov. 9-12, 2015, 9 pages.

Ren et al "End-to-End Instance Segmentation and Counting with Recurrent Attention", arXiv:1605.09410v5, Jul. 13, 2017, 12 pages.

Romera-Paredes et al., "Recurrent Instance Segmentation", arXiv:1511.08250v3, Oct. 24, 2016, 24 pages.

Shi et al., "Convolutional LSTM Network: A Machine Learning Approach for Precipitation Nowcasting", Conference on Neural Information Processing, Montreal, Canada, Dec. 7-12, 2015, 9 pages.

Silberman et al., "Instance Segmentation of Indoor Scenes Using a Coverage Loss", European Conference on Computer Vision, Zurich, Switzerland, Sep. 6-12, 2014, 16 pages.

Simonyan et al., "Very Deep Convolutional Networks for Large-Scale Image Recognition", arXiv:1409.1556v6, Apr. 10, 2015, 14 pages.

Uhrig et al., "Pixel-Level Encoding and Depth Layering for Instance-Level Semantic Labeling", arXiv:1604.05096v2, Jul. 14, 2016, 17 pages.

Van den Brand et al., "Instance-Level Segmentation of Vehicles by Deep Contours", Asian Conference on Computer Vision Workshop, Taipei, Taiwan, Nov. 20-24, 2016, 16 pages.

Yu et al., "Multi-Scale Context Aggregation by Dilated Convolutions", arXiv:1511.07122v3, Apr. 30, 2016, 13 pages.

Zagoruyko et al., "A Multipath Network for Object Detection", arXiv:1604.02135v2, Aug. 8, 2016, 14 pages.

Zhang et al., "Instance-Level Segmentation with Deep Densely Connected MRFs", Computer Vision and Pattern Recognition, Las Vegas, Nevada, Jun. 26-Jul. 1, 2016, 9 pages.

Zhang et al., "Monocular Object Instance Segmentation and Depth Ordering with CNNs", International Conference on Computer Vision, Santiago, Chile, Dec. 13-16, 2015, 9 pages.

\* cited by examiner

SEMANTIC AND INSTANCE SEGMENTATION

RELATED APPLICATIONS

This application claims priority to and the benefit of U.S. Provisional Patent Application No. 62/586,564, titled "Semantic and Instance Segmentation for Object Detection," and filed on Nov. 15, 2017. U.S. Provisional Patent Application No. 62/586,564 is hereby incorporated by reference herein in its entirety.

FIELD

The present disclosure relates generally to improving the ability of computing systems to detect objects within a surrounding environment.

BACKGROUND

Many systems such as autonomous vehicles, robotic systems, and user computing devices are capable of sensing their environment and performing operations without human input. For example, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of detecting objects of interest. The method includes receiving, by a computing system comprising one or more computing devices, sensor data from one or more sensors configured to generate sensor data associated with an environment. The method includes inputting, by the computing system, the sensor data to a machine-learned model configured to generate a class prediction and an instance prediction for each of a plurality of portions of the sensor data. The instance prediction for each portion of the sensor data includes an energy value based on a distance to at least one object boundary. The machine learned model is trained to generate a common energy value to represent the at least one object boundary. The method includes generating, by the computing system as outputs of the machine-learned model, an instance prediction and a class prediction corresponding to each of the plurality of portions of the sensor data. The method includes generating, by the computing system, one or more object segments based at least in part on the instance predictions and the class predictions.

Another example aspect of the present disclosure is directed to a computing system. The computing system includes one or more processors and a machine-learned model configured to receive sensor data representing an environment. The machine-learned model is configured to output, in response to the sensor data, an energy value in association with each of a plurality of portions of the sensor data. The machine learned model is trained to provide a common energy range to represent boundaries between objects in the environment. The computing system includes one or more non-transitory computer-readable media that store instructions, that when executed by the one or more processors, cause the one or more processors to perform operations. The operations include providing, as input to the machine-learned model, sensor data representing the environment. The operations include receiving, as output of the machine-learned model for each of a plurality of portions of the sensor data, a class prediction and an energy value. The energy value is based on a distance of each portion relative to one or more object boundaries. The operations include generating an instance label for each of the plurality of portions of sensor data based on a corresponding energy value and class prediction.

Yet another example aspect of the present disclosure is directed to an autonomous vehicle. The autonomous vehicle includes a sensor system configured to generate sensor data of an environment external to the autonomous vehicle. The autonomous vehicle includes a vehicle computing system. The vehicle computing system includes one or more processors, and one or more non-transitory computer-readable media that store instructions, that when executed by the one or more processors, cause the computing system to perform operations. The operations include providing sensor data from the sensor system as input to a machine-learned neural network including one or more shared layers configured to jointly determine instance information and classification information for each of a plurality of portions of the sensor data. The operations include receiving, as a first output of one or more unshared first layers of the machine-learned neural network, an instance value for each of the plurality of portions of the sensor data based on the instance information from the one or more shared layers. The operations include receiving, as a second output of one or more unshared second layers of the machine-learned neural network, a classification for each of the plurality of portions of the sensor data based on the classification information from the one or more shared layers. The operations include generating an instance label for each of the plurality of portions of the sensor data based on a corresponding classification and instance value from the machine-learned neural network.

Other example aspects of the present disclosure are directed to systems, methods, vehicles, apparatuses, tangible, non-transitory computer-readable media, and memory devices for determining the location of an autonomous vehicle and controlling the autonomous vehicle with respect to the same.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
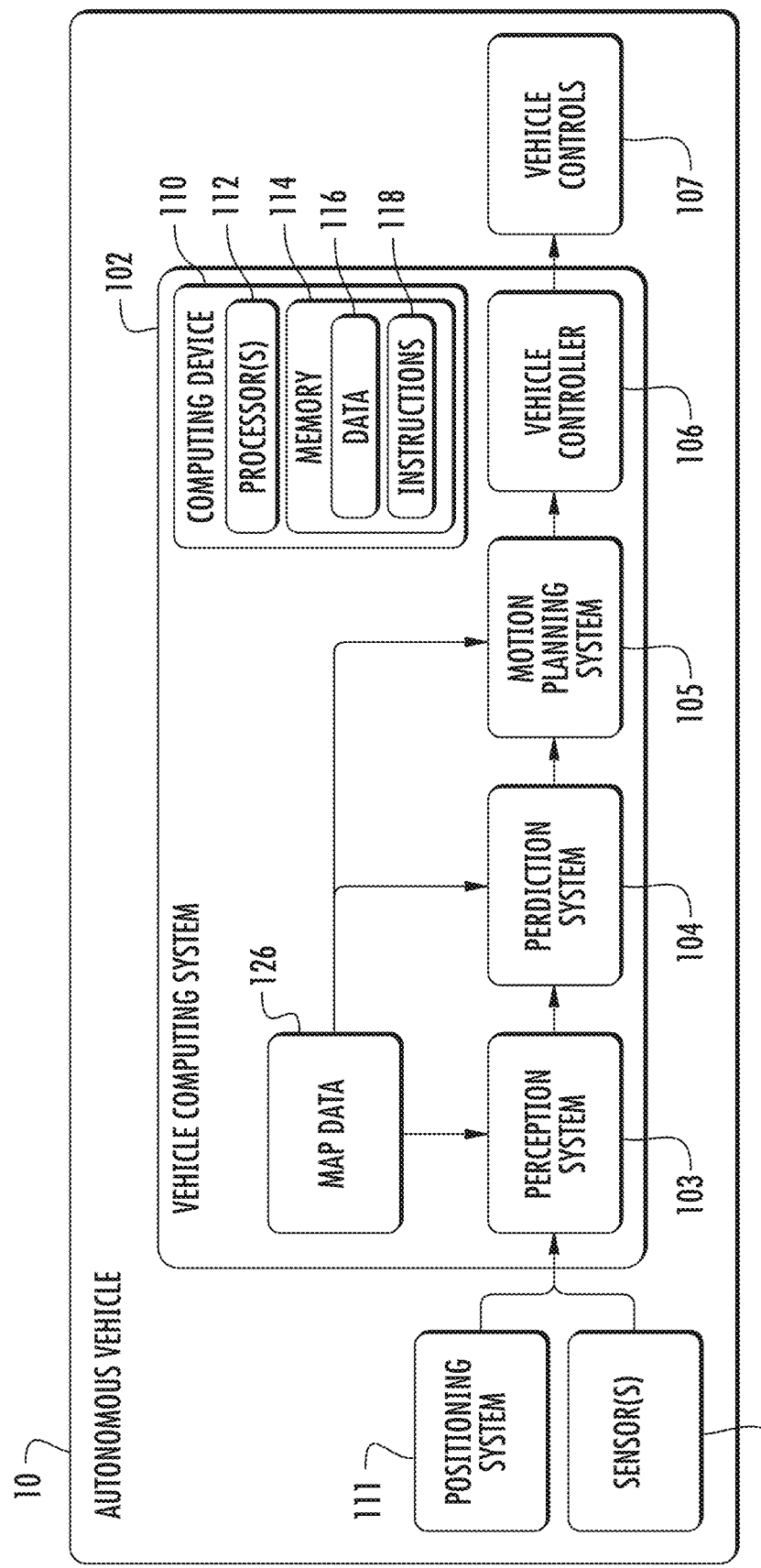
FIG. 1 depicts a block diagram of an example autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods that apply machine-learned models such as neural networks, for example, to class segmentation and/or instance segmentation in an improved manner. For example, the system and methods of the present disclosure can be included in or otherwise leveraged by an autonomous vehicle, non-autonomous vehicle, user computing device, robotic system, etc. In example embodiments, an energy map is generated by a machine-learned model that has been trained to generate energy values for individual portions of sensor data. For instance, a computing system can generate for pixels of an image an energy value based on a distance from each pixel to a nearest object boundary. In example embodiments, the computing system can generate an energy value for each portion (e.g., pixel) of the sensor data, such that the energy value in indicative of the distance of the selected portion to the nearest object boundary. For instance, an energy value for each pixel based on distance to an object boundary can provide a specific value that can be determined and assigned to each pixel. An actual value for each portion can be provided in example embodiments, without binning or otherwise grouping energy values into ranges. In example embodiments, the computing system produces continuous values for each pixel corresponding to the distance to the nearest instance boundary for pixels within countable objects. The energy map can be used to identify object segments within the image. For example, the energy map may be used to predict individual instances of physical objects in an image. In some embodiments, the machine-learned model is trained based on a modified energy transform that provides a common energy level or range to accurately delineate object boundaries. In example embodiments, the object segments may correspond to vehicles, pedestrians, bicycles, etc. and be used by an autonomous vehicle as part of motion planning.

More particularly, in some implementations, a computing system can receive sensor data from one or more sensors that generate sensor data relative to an autonomous vehicle or other system such as a user computing device. In order to autonomously navigate, an autonomous vehicle can include a plurality of sensors (e.g., a lidar system, cameras, etc.) configured to obtain sensor data associated with the autonomous vehicle's surrounding environment as well as the position and movement of the autonomous vehicle. Other computing systems may include sensors configured to obtain sensor data for use in robotic planning, image recognition and object tracking, etc. The computing system can input the sensor data to a machine-learned model that is configured to generate an energy value for each of a plurality of portions of the sensor data based on a distance to at least one object boundary. The sensor data can be image data and the portions of the sensor data may include RGB color values or other values for individual pixels represented by the image data. The machine-learned model can be trained to generate a common energy value or range of energy values to represent the at least one object boundary. The model can output an energy value for each portion of sensor data that is indicative of the distance from the portion to a nearest object boundary. The computing system can generate, as outputs of the machine-learned model, an instance prediction corresponding to each of the plurality of portions of the sensor data. The instance predictions may associate each of the portions of sensor data with a physical instance of an object. The computing system can generate one or more object segments based at least in part on the instance predictions. The object segments can be provided to an object classification and tracking application. By way of example, the computing system can determine a motion plan for an autonomous vehicle or other system based on the object segments. The machine-learned model can be used by other computing systems such as a user computing device for object detection and classification in association with image processing, etc.

In some implementations, the machine-learned model is trained to generate an energy map comprising an energy value for each of a plurality of portions of sensor data, such as for example, each pixel of a camera image or each point of a LIDAR point cloud. The model is trained to generate an energy map where object instances are identified as discrete energy basins. The model is trained to generate an energy value based on the distance between a selected pixel and its nearest object boundary. The model can be trained to generate a low energy value for sensor data portions corresponding to object boundaries and to generate increasingly higher energy values for sensor data further from an object boundary. For example, the system can be trained so that object boundaries and background regions or pixels within a certain number of pixels from an object boundary are assigned a low energy level (e.g., 0). By training the model to represent object boundaries using a common low energy value (or range of low energy values), a single threshold energy level may be established to unambiguously discriminate between object instances.

The application of machine-learning to generate a model based on a modified distance transform permits effective object identification without over-segmentation as may occur with basic distance transforms. In some implementations, the distance transform is applied to an image gradient such that each energy basin corresponds to a homogenous region of the pixel. By training a model end-to-end, fast and accurate object estimations can be achieved.

In some implementations, the system inputs sensor data to a machine-learned model and receives as output an energy value for each of a plurality of portions of the sensor data. The system can apply one or more threshold energy values and identify sensor data portions that are below the threshold as object boundaries. The system can then apply one or more processes to extract connected components within each object boundary to identify an instance of a physical object. In this manner, the system is capable of using one threshold energy level to accurately predict object instances while avoiding over-segmentation.

By way of example, the system may select a pixel within an object boundary that has a threshold energy value that satisfies a threshold value. The system can assign the pixel a first instance identification and then move to a neighboring pixel, such as an adjacent pixel, within the object boundary. The system can determine if the neighboring pixel has an energy value above the threshold and if so, assign to it the same instance identification (e.g., instance label) as the previous pixel. This sequence of identifying pixels within the object boundary is repeated until all pixels within an object boundary are assigned the instance label. The system then selects a pixel from within another object boundary and the process repeats.

In some implementations, a modified distance-based transform is used to generate energy values with object boundaries represented by low energy levels. By way of example, a feed-forward neural network can be provided that learns a distance (e.g, watershed) transform for each pixel based on its position relative to a nearest object boundary. The model is configured to predict an energy landscape such that each distance-based energy basin corresponds to a single instance, while all boundaries (i.e., watershed ridges) are at the same level in the energy domain. In this manner, the feed-forward neural network is trained to perform a distance transform for each point within an object instance to the instance's boundary. The network can be trained by assigning high levels of penalty to errors at low energy levels in order to encourage the network to focus on object boundaries.

Thus, a computing system in accordance with example embodiments can produce an energy map of the image where object boundaries in the map are delineated by low energy levels. By training a model to generate a common energy value or range for object boundaries, over-segmentation of objects can be reduced. Additionally, each portion of the sensor data such as a pixel can be unambiguously identified by assigning to it an instance value based on its distance to a nearest object boundary. An energy value for each pixel based on distance to an object boundary provides a specific value that can be determined and assigned to each pixel. Pixels having an energy value that is above a threshold and that are within an object boundary can be grouped together as an object instance. Each pixel in the group can then be unambiguously assigned the same instance label. By first defining for each pixel a value based on its distance to an object boundary, traditional drawbacks of machine learning where more than one valid instance assignment may be possible can be avoided.

In some implementations, the computing system is configured to additionally obtain a class prediction (also referred to as semantic prediction) for each of the plurality of portions of sensor data. The class predictions can identify each pixel of an image by a class of objects associated with the pixel. In some implementations, class predictions can be determined from a predetermined group of classes, such as vehicles, pedestrians, bicycles, or other objects encountered in the environment of an autonomous vehicle. The computing system is configured to generate an instance label for each of the portions of sensor data based on the corresponding class prediction and instance prediction for the portion. The computing system can apply the class predictions to select regions of an image for instance analysis. Within the pixels corresponding to a particular class, the system applies the energy values to identify particular object instances.

The computing system can input sensor data representing an environment to a machine-learned model and receive as an output of the machine-learned model an instance prediction for each of a plurality of portions of the sensor data. For example, the computing system can receive an energy value for each pixel of an image representing a distance of the pixel to a nearest object boundary. The computing system can additionally obtain a class prediction for each portion of the sensor data. In some examples, the computing system obtains a predetermined class prediction. In other examples, the computing system receives as an additional output of the machine-learned model a class prediction for each pixel of an input image. The class prediction is a class label in some implementations that identifies a predicted class of objects associated with the pixel. The computing system can generate an instance label for each portion of the sensor data based on the corresponding class prediction and instance prediction.

As an example, in some implementations the computing system is configured to receive sensor data from one or more sensors configured to generate sensor data relative to an autonomous vehicle or other system and input the sensor data to a machine-learned model. The computing system can generate as outputs of the machine-learned model, a class prediction and an instance prediction for each of a plurality of portions of the sensor data. In example embodiments, the class prediction can include a continuous value for each pixel corresponding to the distance to the nearest instance boundary. The computing system can generate an instance label for each portion of the sensor data based on a corresponding class prediction and a corresponding instance prediction. The computing system can generate one or more object segments based at least in part on the class predictions and the instance predictions. The computing system can provide the one or more object segments to an object classification and tracking application. By way of example, a residual network based convolutional stack can be used to extract feature from an RGB image. A pyramid scene parsing network-style pooling can be used to aggregate multi-scale information. Two output branches for each of class and instance segmentation outputs can be provided.

In some implementations, a computing system is configured to receive sensor data such as imagery from one or more sensors positioned relative to an autonomous vehicle or other system. The computing system can input the sensor data, such as pixels from an image for example, to a machine-learned model. The machine-learned model can be trained to generate as a first output an energy map that provides an instance prediction including a distance-based energy value for each of the input pixels. The machine-learned model can be trained to generate as a second output a class prediction for each of the input pixels. The computing system can filter the pixels based on the class predictions to identify a subset of pixels corresponding to a particular class. The computing system can extract individual object instances from the subset of pixels based on the energy values. For example, the system can apply thresholding to the energy values to identify object boundaries and extract object instances. The computing system can generate one or more object segments based on the filtered energy map. For example, the system can identify coordinates that identify the object boundaries of the object segments. The computing system can input the one or more object segments to an object classification and tracking application. In some implementations, the output of the object classification and tracking application may be used to determine one or more motion plans for an autonomous vehicle, based at least in part on the object segments. The machine-learned can be used by other computing systems such as a user computing device for object tracking in association with image recognition, classification, etc.

More particularly, in some implementations, a machine-learned model is provided that jointly performs class prediction and instance prediction for sensor data portions. For example, a neural network can include a first portion that uses feature sharing on the sensor data to jointly produce class predictions and instance predictions for pixels of an image. With feature sharing across a common portion of a neural network, the computing system can jointly determine the class of a pixel, as well as a particular instance of the class to which the pixel is associated. Such an approach can overcome deficiencies with object segmentation approaches that may utilize separate class and instance segmentation models without feature sharing.

Further, the machine-learned model may include individual portions associated with instance segmentation and class segmentation. For example, a second portion of a neural network may receive the output of the first portion and determine a class prediction for each pixel and a third portion may receive the output of the first portion and determine an instance prediction for each pixel. The system can filter the instance predictions based on the class predictions so that instance segmentation is performed only for those pixels associated with a particular class. After selecting pixels that correspond to the selected class, the computing system can perform thresholding to extract individual object instances from the energy map.

The first portion of the neural network can include a first set of shared layers that is configured to jointly determine class and instance information for each pixel. The second portion of the neural network can include a second set of unshared layers that are configured to determine the class prediction for each pixel using the output of the first set of shared layers. The third portion of the neural network can include a third set of unshared layers that are configured to determine the instance predictions for each pixel using the output of the first set of shared layers.

In some implementations, the computing system is configured to provide sensor data from a sensor system as input to a machine-learned neural network. The neural network includes one or more shared layers that are configured to jointly determine instance information and classification information for each of a plurality of portions of the sensor data. The computing system can receive, as a first output of one or more unshared first layers of the neural network, an instance value for each of the portions of sensor data based on the instance information from the one or more shared layers. The computing system can receive, as a second output of one or more unshared second layers of the neural network, a classification for each of the plurality of portions of the sensor data based on the classification information from the one or more shared layers. The computing system can generate an instance label for each of the plurality of portions of the sensor data based on a corresponding classification and instance value from the machine-learned model.

In some implementations, when training the machine-learned model to predict instance information characterizing one or more objects in the environment proximate to the autonomous vehicle or other system, a training dataset can include a large number of previously obtained input images and corresponding labels that describe corresponding object data for objects detected within such input images. In this manner, the machine-learned model may be trained to detect object boundaries and to generate low energy values for the detected boundaries. Additionally, the machine-learned model may be trained to generate energy values based on a distance of each pixel to a nearest object boundary.

The machine-learned model can include one or more neural networks (e.g., deep neural networks), support vector machines, decision trees, ensemble models, k-nearest neighbors models, Bayesian networks, or other types of models including linear models and/or non-linear models. Example neural networks can include feed-forward neural networks, convolutional neural networks, recurrent neural networks (e.g., long short-term memory (LSTM) recurrent neural networks, gated recurrent unit (GRU) neural networks), or other forms of neural networks.

In some implementations, when training the machine-learned model to determine object data characterizing one or more objects in the environment proximate to the autonomous vehicle or other system based on distance to a nearest object boundary, a training dataset can include a large number of previously obtained input images and corresponding labels that describe corresponding object data for objects detected within such input images. The labels included within the detector training dataset can be manually annotated, automatically annotated, or annotated using a combination of automatic labeling and manual labeling.

In some implementations, to train the model, a training computing system can input a first portion of a set of ground-truth data (e.g., a portion of a training dataset corresponding to input image data) into the machine-learned model to be trained. In response to receipt of the portion, the machine-learned model outputs energy values for pixels within the input image data based on a distance to a detected object boundary. This output of the machine-learned model predicts the remainder of the set of ground-truth data (e.g., a second portion of the training dataset). After the prediction, the training computing system can apply or otherwise determine a loss function that compares the energy value output by the machine-learned model to the remainder of the ground-truth data which the model attempted to predict. The training computing system then can backpropagate the loss function through the model to train the model (e.g., by modifying one or more weights associated with the model). This process of inputting ground-truth data, determining a loss function and backpropagating the loss function through the model can be repeated numerous times as part of training the model. For example, the process can be repeated for each of numerous sets of ground-truth data provided within the training dataset.

More particularly, in some implementations, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle can include a computing system that assists in controlling the autonomous vehicle. In some implementations, the autonomous vehicle computing system can include a perception system, a prediction system, and a motion planning system that cooperate to perceive the surrounding environment of the autonomous vehicle and determine one or more motion plans for controlling the motion of the autonomous vehicle accordingly. The autonomous vehicle computing system can include one or more processors as well as one or more non-transitory computer-readable media that collectively store instructions that, when executed by the one or more processors, cause the autonomous vehicle computing system to perform various operations as described herein.

In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle.

In addition to the sensor data, the perception system can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the computing system in comprehending and perceiving its surrounding environment and its relationship thereto.

The perception system can identify one or more objects that are proximate to the autonomous vehicle based on sensor data received from the one or more sensors and/or the map data. In particular, in some implementations, the perception system can provide, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding polygon); class (e.g., vehicle vs. pedestrian vs. bicycle), and/or other state information.

The prediction system can receive the state data and can predict one or more future locations for the object(s) identified by the perception system. For example, various prediction techniques can be used to predict the one or more future locations for the object(s) identified by the perception system. The prediction system can provide the predicted future locations of the objects to the motion planning system.

The motion planning system can determine one or more motion plans for the autonomous vehicle based at least in part on the state data provided by the perception system and/or the predicted one or more future locations for the objects. Stated differently, given information about the current locations of proximate objects and/or predictions about the future locations of proximate objects, the motion planning system can determine motion plan(s) for the autonomous vehicle that best navigate the vehicle relative to the objects at their current and/or future locations.

As an example, in some implementations, the motion planning system operates to generate new autonomous motion plan(s) for the autonomous vehicle multiple times per second. Each new autonomous motion plan can describe motion of the autonomous vehicle over the next several seconds (e.g., 5 seconds). Thus, in some example implementations, the motion planning system continuously operates to revise or otherwise generate a short-term motion plan based on the currently available data.

Once the motion planning system has identified the optimal motion plan (or some other iterative break occurs), the optimal candidate motion plan can be selected and executed by the autonomous vehicle. For example, the motion planning system can provide the selected motion plan to a vehicle controller that controls one or more vehicle controls (e.g., actuators that control gas flow, steering, braking, etc.) to execute the selected motion plan until the next motion plan is generated.

The systems and methods of the present disclosure provide a number of technical effects and benefits. As one example, the techniques described herein enable a computing system to generate instance information for an image or other sensor data using modified distance information with a single level to discriminate energy basins. In this manner, the computing system is able to assign distance-based energy values to pixels in determining instance information. Because the energy values are specifically defined, the system avoids inefficiencies or inabilities associated with machine-learning models that provide arbitrary instance assignment. In this manner, the computing system can perform instance predictions with significantly reduced times and with greater accuracy. This can reduce the amount of processing required to implement the machine-learned model, and correspondingly, improve the speed at which predictions can be obtained.

As one example, the techniques described herein enable a computing system to use a single machine-learned model such as a single neural network to generate class and instance information. This architecture allows the computing system to jointly determine class and instance information and thus avoids conflicts as may arise when two models are used to independently provide class and instance predictions. Moreover, the use of a single model can reduce the amount of computer resources required and increase the speed at which predictions can be obtained. Additionally, the use of a single neural network permits feature sharing as part of determining class and instance information as a volume moves through the network.

As one example, the techniques described herein enable a computing system to combine instance information and class information to more efficiently generate instance labels. For example, the computing system can use class predictions to reduce the number of pixels in an image that are examined for determining particular instances of an object in the class. By reducing the pixels that are examined, the system can more efficiently determine instance labels for selected pixels. Additionally, by combining the class information with the instance information, more accurate instance labels can be assigned to the pixels.

Thus, the computing system can more efficiently and accurately identify object instances from sensor data. By way of example, the more efficient and accurate determination of object instances can improve the operation of self-driving cars or object manipulation in robotics.

Although the present disclosure is discussed with particular reference to autonomous vehicles, the systems and methods described herein are applicable to the use of machine-learned models for object detection and classification by other systems. For example, the techniques described herein can be implemented and utilized by other computing systems such as, for example, user devices, robotic systems, non-autonomous vehicle systems, etc. (e.g., to track objects for advanced imaging operations, robotic planning, etc.). Further, although the present disclosure is discussed with particular reference to certain networks, the systems and methods described herein can also be used in conjunction with many different forms of machine-learned models in addition or alternatively to those described herein. The reference to implementations of the present disclosure with respect to an autonomous vehicle is meant to be presented by way of example and is not meant to be limiting.

With reference now to the Figures, example embodiments of the present disclosure will be discussed in further detail.

FIG. 1 depicts a block diagram of an example autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft, rail-based vehicles, etc.).

The autonomous vehicle 10 includes one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 includes a computing device 110 including one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause vehicle computing system 102 to perform operations.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the autonomous vehicle 10. The positioning system can be any device or circuitry for analyzing the position of the autonomous vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations.

As one example, in some implementations, the motion planning system 105 can evaluate one or more cost functions for each of one or more candidate motion plans for the autonomous vehicle 10. For example, the cost function(s) can describe a cost (e.g., over time) of adhering to a particular candidate motion plan and/or describe a reward for adhering to the particular candidate motion plan. For example, the reward can be of opposite sign to the cost.

The motion planning system 105 can provide the optimal motion plan to a vehicle controller 106 that controls one or more vehicle controls 107 (e.g., actuators or other devices that control gas flow, steering, braking, etc.) to execute the optimal motion plan. The vehicle controller can generate one or more vehicle control signals for the autonomous vehicle based at least in part on an output of the motion planning system.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

In various implementations, one or more of the perception system 103, the prediction system 104, and/or the motion planning system 105 can include or otherwise leverage one or more machine-learned models such as, for example convolutional neural networks.

Figure 2:
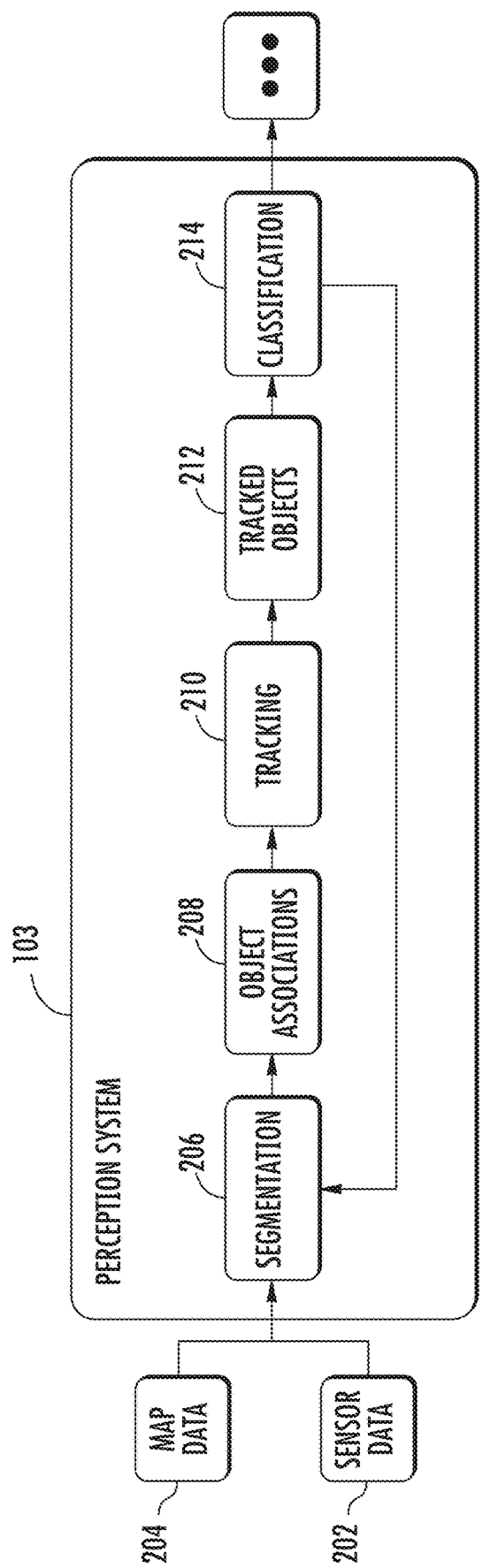
FIG. 2 depicts a block diagram of an example perception system according to example embodiments of the present disclosure.

FIG. 2 depicts a block diagram of an example perception system 103 according to example embodiments of the present disclosure. As discussed in regard to FIG. 1, a vehicle computing system 102 can include a perception system 103 that can identify one or more objects that are proximate to an autonomous vehicle 10. In some embodiments, the perception system 103 can include segmentation component 206, object associations component 208, tracking component 210, tracked objects component 212, and classification component 214. The perception system 103 can receive sensor data 202 (e.g., from one or more sensor(s) 101 of the autonomous vehicle 10) and map data 204 as input. The perception system 103 can use the sensor data 202 and the map data 204 in determining objects within the surrounding environment of the autonomous vehicle 10. In some embodiments, the perception system 103 iteratively processes the sensor data 202 to detect, track, and classify objects identified within the sensor data 202. In some examples, the map data 204 can help localize the sensor data to positional locations within a map data or other reference system.

Within the perception system 103, the segmentation component 206 can process the received sensor data 202 and map data 204 to determine potential objects within the surrounding environment, for example using one or more object detection systems. The object associations component 208 can receive data about the determined objects and analyze prior object instance data to determine a most likely association of each determined object with a prior object instance, or in some cases, determine if the potential object is a new object instance. The tracking component 210 can determine the current state of each object instance, for example, in terms of its current position, velocity, acceleration, heading, orientation, uncertainties, and/or the like. The tracked objects component 212 can receive data regarding the object instances and their associated state data and determine object instances to be tracked by the perception system 103. The classification component 214 can receive the data from tracked objects component 212 and classify each of the object instances. For example, classification component 214 can classify a tracked object as an object from a predetermined set of objects (e.g., a vehicle, bicycle, pedestrian, etc.). The perception system 103 can provide the object and state data for use by various other systems within the vehicle computing system 102, such as the prediction system 104 of FIG. 1.

Figure 3:
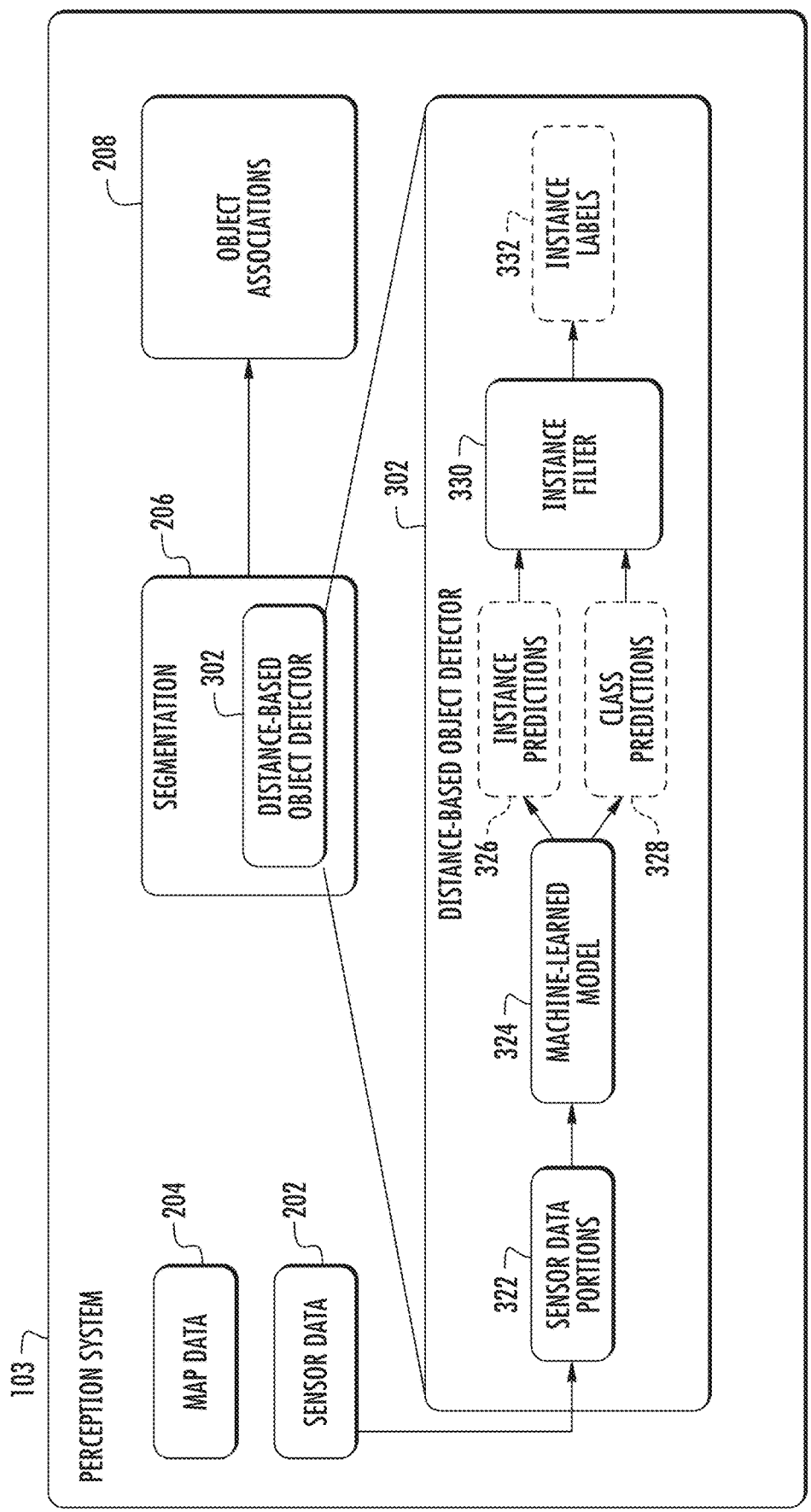
FIG. 3 depicts an example of an object detection system according to example embodiments of the present disclosure.

FIG. 3 depicts a block diagram of an example object detection system 300 in a perception system of an autonomous vehicle according to example embodiments of the present disclosure. In particular, FIG. 3 illustrates an example embodiment of a distance-based object detector 302 which provides object detection in a segmentation component (e.g., segmentation component 206 of FIG. 2) of a perception system (e.g. perception system 103 of FIG. 1). As discussed in regard to FIG. 2, the perception system 103 can include a plurality of systems for detecting, classifying, and/or tracking one or more objects, including a segmentation component 206. In some embodiments, the segmentation component 206 can implement one or more object detection systems to detect potential objects of interest based at least in part on data (e.g., image sensor data, etc.) provided from one or more sensor systems included in the autonomous vehicle. For example, in some embodiments, a camera system of a sensor system (e.g., sensor(s) 101 of FIG. 1) of an autonomous vehicle can generate image sensor data and provide the image sensor data to a vehicle computing system of the autonomous vehicle (e.g., vehicle computing system 102 of FIG. 1).

As discussed above, the perception system 103 can receive sensor data and map data (e.g., sensor data 202 and map data 204 of FIG. 2) for use in detecting, classifying, and/or tracking objects within the surrounding environment of an autonomous vehicle (e.g., autonomous vehicle 10 of FIG. 1).

As illustrated in FIG. 3, the segmentation component 206 can include a distance-based object detector 302 to detect potential objects of interest based at least in part on sensor data 202 such as LIDAR sensor data or RGB image sensor data. In some embodiments, the distance-based object detector 302 can include a machine-learned model 324 and an instance filter 330.

In some embodiments, the distance-based object detector 302 can use the sensor data to determine instance information and/or class information for each sensor data portion 322. The distance-based object detector can input the sensor data 202 as individual sensor data portions 322 (e.g., each pixel) into a machine-learned model 324, such as a machine-learned neural network or convolutional neural network. For example, the sensor data may represent an environment proximate to an autonomous vehicle or other system. The machine-learned model 324 can produce one or more model outputs, such as class predictions 328 and instance predictions 326 for each sensor data portion.

In accordance with example embodiments, class predictions 328 can include a prediction of a type of object or a class of object with which each sensor data portion 322 is most closely associated. Examples of classes or class predictions may include vehicles, pedestrians, street signs, or any other objects encountered in the environment of an autonomous vehicle. Accordingly, each class prediction 328 may specify a predicted type of object with which the pixel or other sensor data portion is most closely associated. In some examples, each class prediction is a classification of a sensor data portion.

In accordance with example embodiments, instance predictions 326 include a prediction of a particular object with which each sensor data portion 322 is most closely associated. By way of example, an instance prediction for a group of pixels may specify that each pixel in the group is associated with the same object. Instance predictions may include an instance value. As described hereinafter, instance predictions 326 can be energy values generated for each sensor data portion in some examples. The energy values represent a distance of each pixel relative to one or more object boundaries. For example, the energy values may represent the distance to a nearest object boundary and can be provided as instance information or an instance prediction 326. An energy value for each pixel based on distance to an object boundary can provide a specific value that can be determined and assigned to each pixel. An actual value for each portion can be provided in example embodiments, without binning or otherwise grouping energy values into ranges. In example embodiments, the computing system produces continuous values for each pixel corresponding to the distance to the nearest instance boundary for pixels within countable objects.

In some embodiments, the distance-based object detector 302 can provide the one or more model outputs (e.g., class predictions and instance predictions) to an instance filter 330 that can generate instance labels 332 for each pixel of other sensor data portion 322. Instance filter 330 may receive an instance prediction such as an energy value as an output of the machine-learned model for each sensor data portion. Instance filter 330 may generate an instance label for each portion of sensor data based on its corresponding energy value in some examples. Instance filter may additionally receive a class prediction as an output of the machine-learned model. Instance filter 330 may generate an instance label for each portion of sensor data based on a corresponding classification and instance value from the machine-learned model. Instance filter 330 may generate an instance label for each portion of sensor data based on its corresponding energy value and class prediction in some examples. For example, instance filter 330 may identify a group of pixels having the same object type using class predictions 328. Within the set of pixels having the same class prediction, instance filter 330 can use instance predictions 326 to generate for each pixel of the set an instance label representing the particular object with which the pixel is most closely associated. In some embodiments, the instance filter 330 may include alternate or additional filtering steps.

In some embodiments, the distance-based object detector can generate segmented object candidates which can include, for example, a bounding box or other bounding shape for each object instance. In some examples, the distance-based object detector can predict the segmentation of object instances based on the instance labels. The distance-based object detector can then estimate a bounding box for each object instance based on the instance labels of the pixels.

The distance-based object detector 302 can provide the object segment candidates (e.g., object segments and/or polygons) to the segmentation component 206 such that selected segmented object candidates can be provided to one or more other components implemented in the perception system 103, such as the object associations component 208, for use in tracking and/or classifying objects of interest.

In some embodiments, for example when a plurality of object detection systems are implemented in segmentation component 206, the segmentation component 206 can include a segment selector which receives segmented object candidates from the plurality of object detection systems and determines the most likely segmented object candidates to be provided to other components within the perception system 103 for tracking and classification of the objects.

Figure 4:
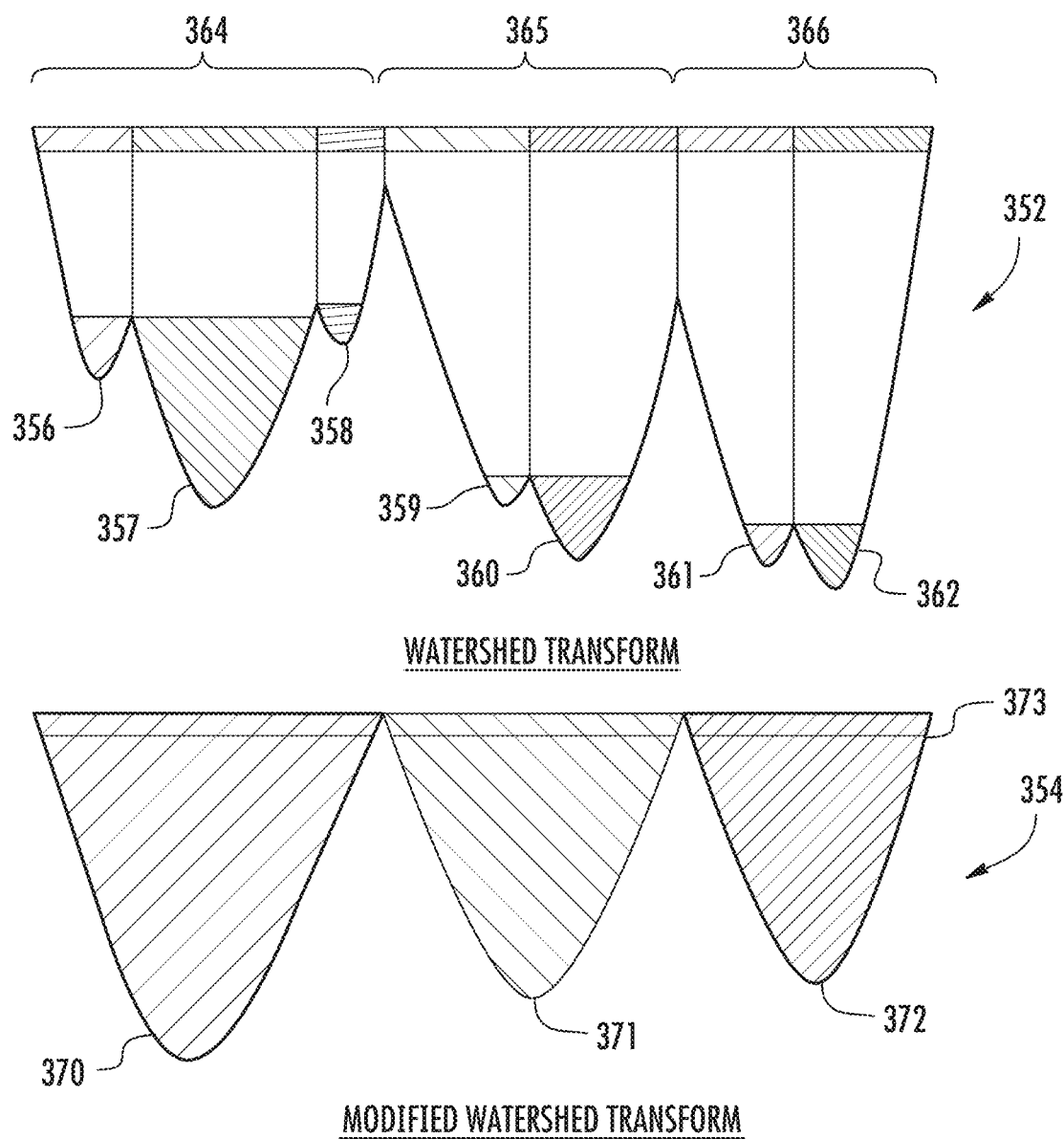
FIG. 4 depicts a block diagram illustrating a traditional watershed transform and a modified watershed transform according to example embodiments of the present disclosure.

In example embodiments, one or more classical grouping techniques can be combined with modern deep neural networks to provide an effective and efficient technique for performing instance segmentation. For instance, a novel approach can combine one or more classical watershed transform techniques with modern deep neural networks. FIG. 4 is a graphical representation depicting a traditional watershed transform 352 and modified watershed transform 354 in accordance with example embodiments of the disclosed technology. A watershed transform begins with the premise that a grayscale image can be considered as a topographic surface. If the surface is flooded from each of its minima, and merging of waters from different sources is prevented, the image can be effectively partitioned into different components (i.e., regions). These components or regions may be referred to as catchment basins. The barriers or watershed lines then represent the boundaries between different basins (i.e. boundaries between regions). The transformation can typically be applied to the image gradient, such that the basins correspond to homogenous regions in the image.

An example of a traditional watershed transform 352 for a one-dimensional energy function is depicted in FIG. 4. In this example, the watershed transform 352 results in seven components 356-362, each represented by a distinct cross-hatching in FIG. 4. A considered limitation of the watershed transform is its propensity to over segment the image. For example, the traditional watershed transform tends to produce an over segmentation of the image due to spurious small ridges which produce separate components. In this example, although there are three main components 364, 365, and 366, the watershed transform over segments the image because of small perturbations in energy.

In accordance with example embodiments, an approach is provided which directly learns to predict an energy landscape. A novel approach is presented for instance level segmentation where the energy of the watershed transform is learned using a feedforward neural network or other suitable machine learned model. A system is provided that includes learning to predict an energy landscape such that each basin corresponds to a single instance, while ridges are the same height in the energy domain. As a consequence, the watershed cut corresponds to a single threshold in energy, which does not lead to over segmentation. A learned watershed transform 354 in accordance with example embodiments of the disclosed technology is also depicted in FIG. 4. The learned or ground truth modified watershed transform 354 represents a combination of the strength of modern deep neural networks and the power of classical bottom-up grouping techniques. The energy of the watershed transform is directly learned such that each basin corresponds to a single instance, while all dividing ridges are the same height in the energy domain. As a consequence, the components can be extracted by a cut at a single energy level without leading over segmentation. A single cut at the threshold energy level 373 results in an accurate segmentation of the image into three components 370, 371, and 372, corresponding directly to the three main components 364, 365, and 366.

Figure 5:
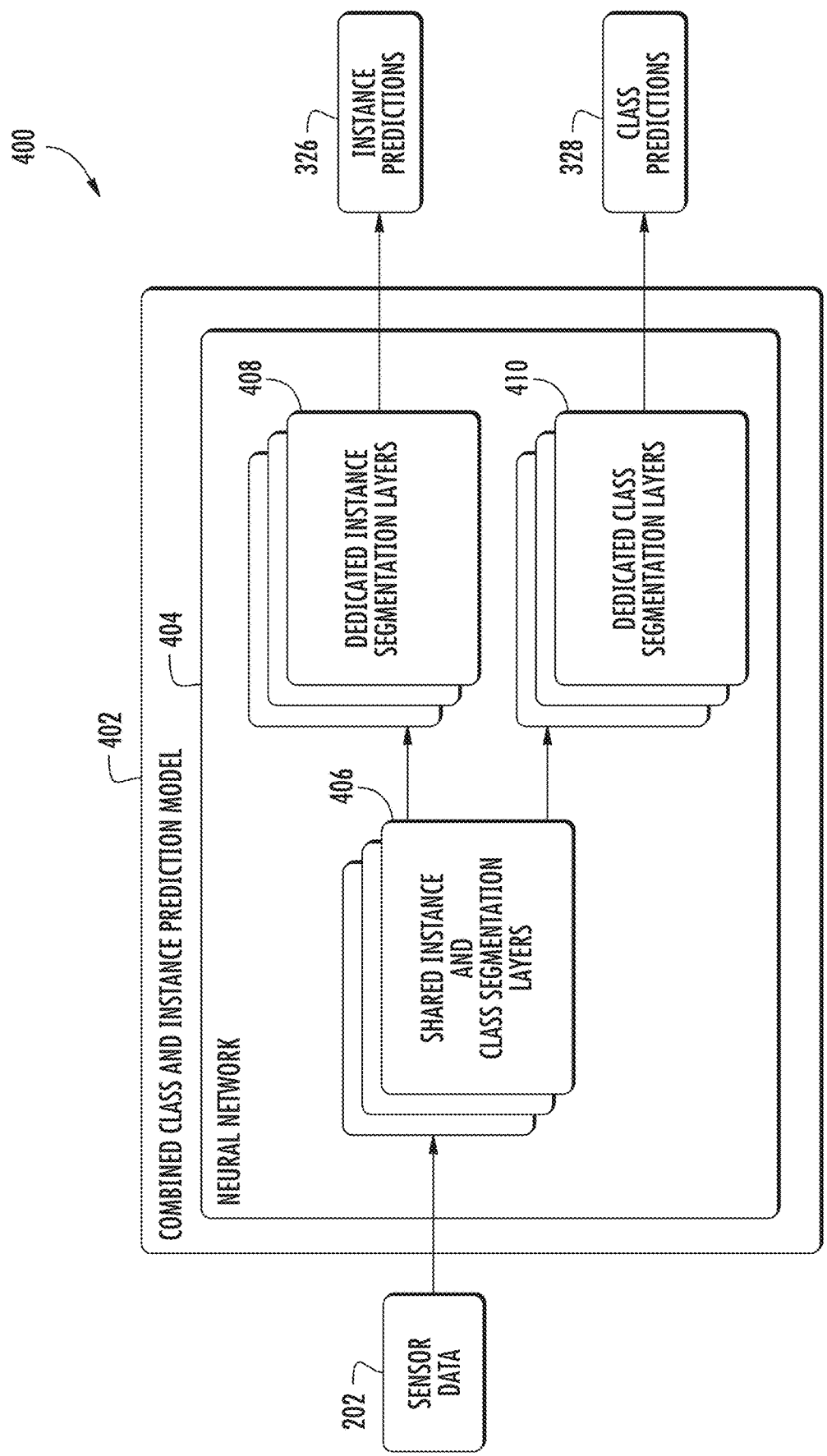
FIG. 5 depicts an example of a machine-learned model with combined class and instance prediction for object detection according to example embodiments of the present disclosure.

FIG. 5 is a block diagram depicting an example of a machine learned model for distance-based object detection in accordance with example embodiments of the present disclosure. In particular, in some embodiments, the distance-based object detection system 400 depicted in FIG. 5 can include features for use in distance-based object detector 302 depicted in FIG. 3. For example, a combined class and instance prediction model 402 depicted in FIG. 5 can be considered to apply to machine learned model 324 of FIG. 3. Distance-based object detection system 400 may use sensor data as input for the machine learned model to facilitate the detection and classification of potential objects of interest. For example, the distance-based object detection system 400 may use sensor data 202 as input for combined class and instance prediction model 402.

According to some aspects of the present disclosure, the combined class and instance prediction model 402 can include a neural network 404 and for example, can be a type of feedforward neural network such as a convolutional neural network. The machine learned model 402 can produce machine learned model outputs, for example, including instance predictions 326 and class predictions 328. Instance predictions 326 can be energy values for sensor data portions and class predictions can be class identifiers for sensor data portions in example embodiments. An energy value for each pixel based on distance to an object boundary can provide a specific value that can be determined and assigned to each pixel. The machine learned model outputs can then be used by the distance-based object detection system 400 to generate object segments or segmented object candidates for use by components implemented in perception system 103, for example. In some embodiments, the machine learned model outputs can be subjected to post-processing to create object segments and/or polygons, which can then be analyzed further in perception system 103, such as for object tracking and classification, for example.

According to an aspect of the present disclosure, combined class and instance prediction model 402 can implement both class prediction (e.g., determining a type of object most closely associated with each portion of sensor data) and instance prediction (e.g., determining a particular object most closely associated with each portion of sensor data) with a single forward pass of data through the machine-learned model. For instance, the combined class and instance prediction model 402 can include a plurality of shared layers that are used at least in part both for determining the class prediction and the instance prediction for each portion of the sensor data. More particularly, combined class and instance prediction model 402 can include a plurality of shared instance and class segmentation layers 406. The plurality of shared instance and class segmentation layers 406 can jointly determine class information and instance information for each pixel or other portion of sensor data. The shared instance and class segmentation layers 406 can jointly reason about class and instance information regarding each pixel or other group of sensor data.

Combined class and instance prediction model 402 can also include additional layers. For example, combined class and instance prediction model 402 can include one or more dedicated instance segmentation layers 408 and one or more dedicated class segmentation layers 410. The one or more dedicated instance segmentation layers 408 structurally follow the plurality of shared instance and class segmentation layers 406. Instance segmentation layers 408 receive a first output of the shared instance and class segmentation layers 406. The output may include instance information and/or class information relating to each portion of sensor data. Instance segmentation layers 408 receive the first output from the shared instance and class segmentation layers 406 and generate instance predictions 326 for each portion of the sensor data. In example embodiments, the instance predictions are an energy value based on a distance of each pixel to a nearest object boundary. The one or more dedicated class segmentation layers 410 also structurally follow the plurality of shared instance and class segmentation layers 406. Class segmentation layers 410 receive a second output of the shared instance and class segmentation layers 406. The second output may include class information and/or instance information relating to each portion of sensor data. Class segmentation layers 410 receive the second output from the shared instance and class segmentation layers 406 and generate class predictions 328 for each portion of the sensor data. In some examples, the first output and the second output of shared instance and class segmentation layers 406 are the same.

Figure 6:
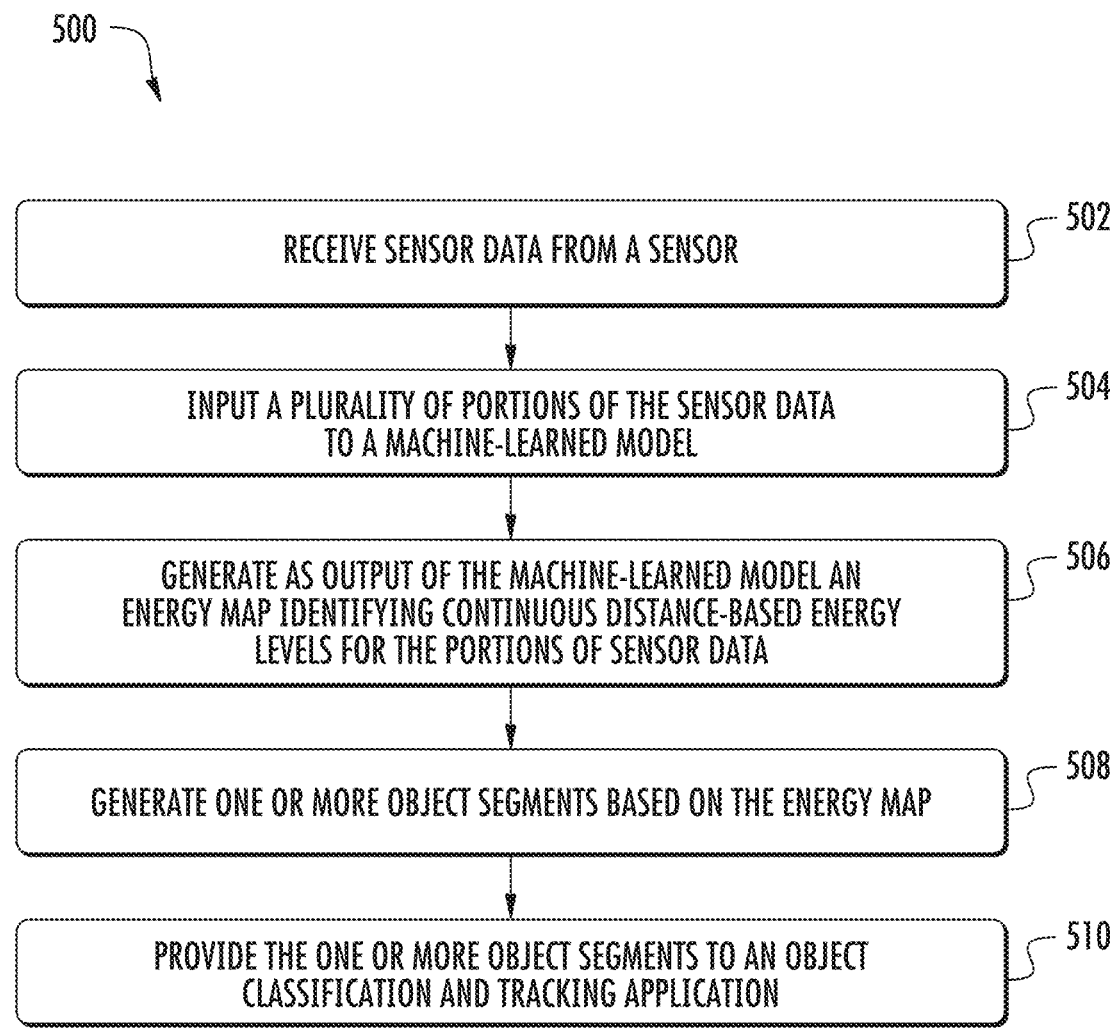
FIG. 6 depicts a flowchart diagram of an example process of object detection using a distance-based energy map according to example embodiments of the present disclosure.

FIG. 6 is a flowchart diagram depicting an example process 500 of distance-based object detection in accordance with example embodiments of the present disclosure. One or more portions of process 500 (and processes 520, 550, 580, and 600 described hereinafter) can be implemented by one or more computing devices such as, for example, the computing devices 110 within vehicle computing system 102 of FIG. 1, or example computing system 1000 of FIG. 13. Moreover, one or more portions of the processes described herein can be implemented as an algorithm on the hardware components of the devices described herein (e.g., as in FIGS. 1, 2, 3, and 5) to, for example, detect objects within sensor data. In example embodiments, process 500 may be performed by a distance-based object detector 302, as part of a segmentation component 206 within a perception system 103 of a vehicle computing system 102.

At 502, one or more computing devices within a computing system can receive sensor data from a sensor. In some embodiments, the sensor data is LIDAR data from one or more LIDAR sensors positioned on or in the autonomous vehicle, RADAR data from one or more RADAR sensors positioned on or in the autonomous vehicle, or image data from one or more image sensors (e.g., cameras) positioned on or in an autonomous vehicle. In some embodiments, a perception system implemented in the vehicle computing system, such as perception system 103 of FIG. 1, can generate the sensor data received at 502 based on image sensor data received from one or more image sensors including a sensor system, such as sensor system including sensors 101 of FIG. 1. In other examples, the sensors may be positioned on or in other systems, such as robotic systems, user computing devices (mobile computing device, phone, tablet, etc.), and the like.

At 504, the one or more computing devices can input a plurality of portions of the sensor data into a machine learned model such as a convolutional neural network, for example, to be used in generating machine learned model output data (for example, convolutional neural network output data). The machine learned model into which the sensor data can be provided as input at 504 can correspond, for example, to a machine learned model 324 of FIG. 3 and/or combined class and instance prediction model 402.

At 506, the one or more computing devices can generate as an output of the machine learned model, an energy map including distance-based energy values for the portions of sensor data. The energy map can include an energy value for each portion of the sensor data. The energy value for each portion can be based on a distance of the sensor data portion to at least one object boundary. For example, an output can be generated for each pixel that includes an energy value representing the distance from the pixel to a nearest object boundary. In example embodiments, the computing system produces continuous values for each pixel corresponding to the distance to the nearest instance boundary for pixels within countable objects. In some examples, the machine learned model is trained to generate a common energy value to represent the at least one object boundary.

At 508, one or more computing devices within a computing system can generate one or more objects segments based on the energy map. Various techniques may be used to generate the one or more objects segments based on the energy map at 508. In one example, one or more thresholds can be used. Sensor data portions having energy values that fail to satisfy the one or more thresholds can be treated as corresponding to one or more object boundaries. For sensor data portions having energy values that satisfy the one or more thresholds, a connected components (e.g., seeding) or other suitable process is used to group sensor data portions that correspond to the same instance of an object. More particularly, in one aspect, a seeding process can be used whereby a first sensor data portion that satisfies the one or more thresholds is selected and provided with an instance label. The first sensor data portion has a location relative to a first object boundary. A second sensor data portion within the first object boundary and that satisfies the one or more thresholds is selected and assigned the first instance label. In example embodiments, the second sensor data portion is determined to be within the first object boundary if it can be reached from the first sensor data portion without crossing the object boundary. This process is repeated until all sensor data portions within the first object boundary are assigned the first instance label. When no more sensor data portions remain within the first object boundary, a sensor data portion outside of the first object boundary is selected and provided with a second instance label. This process repeats until each sensor data portion is associated with one or more instance identifiers. In some examples, each object segment generated at 508 includes a set of sensor data portions having a common instance label. In some examples, a bounding box for each segmented object instance can be generated at 508.

At 510, the one or more computing devices within a computing system can provide the one or more objects segments to an object classification and tracking application, for example, for use in tracking and classifying objects of interest in the perception system implemented in the vehicle computing system.

Although FIG. 6 depicts steps performed in a particular order for purposes of illustration and discussion, the methods of the present disclosure are not limited to the particularly illustrated order or arrangement. The various steps of process 500 (and processes 520, 550, 580, and 600 described hereinafter) can be omitted, rearranged, combined, and/or adapted in various ways without deviating from the scope of the present disclosure.

Figure 7:
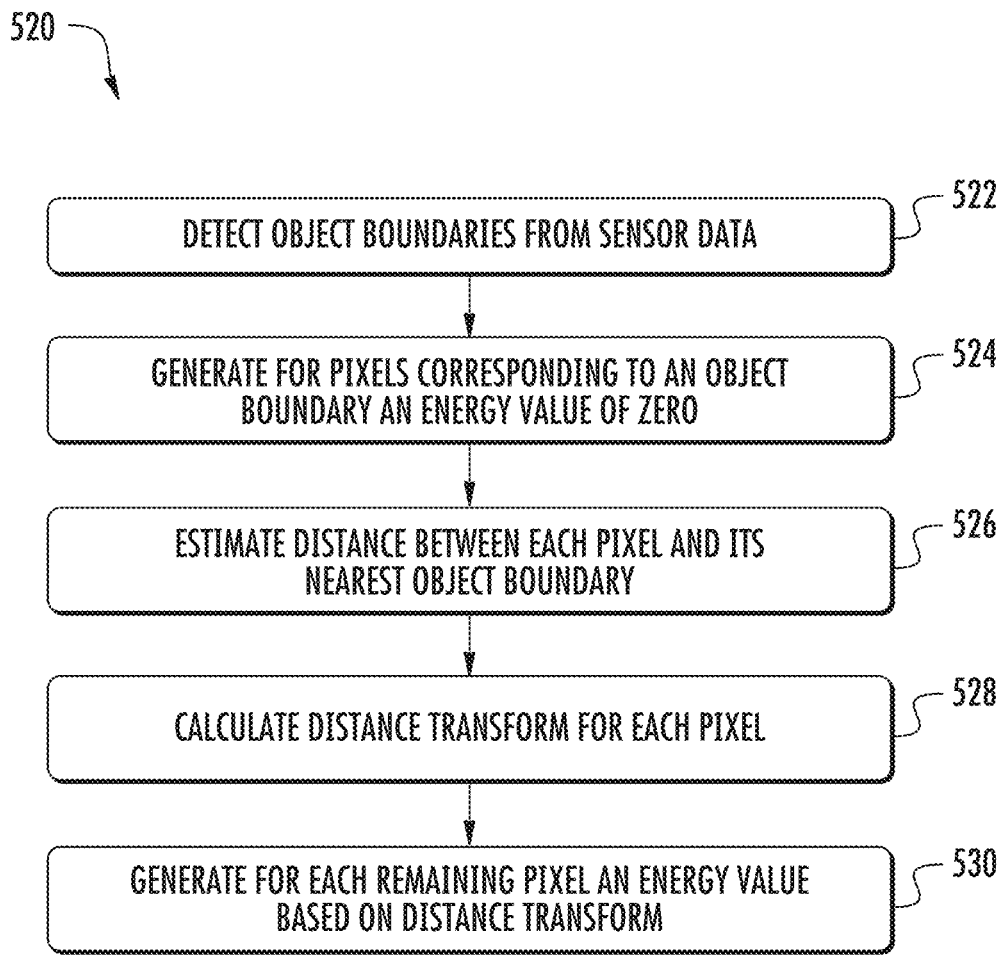
FIG. 7 depicts a flowchart diagram of an example process of generating a distance-based energy map from image data according to example embodiments of the present disclosure.

FIG. 7 is a flowchart diagram depicting a process 520 of generating an energy map as part of a distance-based object detection process in accordance with example embodiments of the present disclosure. In some examples, process 520 can be performed at 506 of process 500 as part of generating, as an output of the machine learned model, an energy map identifying distance-based energy values for portions of sensor data. For instance, process 520 can be used to generate for each pixel of image sensor data an energy value that represents the distance of each pixel to a nearest object boundary of the image sensor data. In example embodiments, process 520 may be performed by a distance-based object detector 302, using a machine-learned model 324. More particularly, process 520 may be at least partially performed by dedicated instance segmentation layers 408 within a neural network 404 of a machine-learned model.

At 522, one or more computing devices within a computing system can detect one or more object boundaries from sensor data. The one or more object boundaries can be predicted boundaries between objects depicted in the sensor data. The one or more object boundaries may result in a partitioning of an image into different components or regions. Each component or region or a subset of the components or regions may correspond to objects.

At 524, the computing system can generate for pixels (or other sensor data portions) corresponding to an object boundary an energy level or energy value of zero. Other energy levels may be used to represent object boundaries. In some examples, additional pixels may be assigned a zero energy value in association with an object boundary. For example, one or more pixels neighboring a pixel corresponding to an object boundary may also be assigned an energy value of zero. It is noted that the assigned energy value of zero is provided by way of example and any predetermined energy value for pixels corresponding to an object boundary can be used.

At 526, the computing system can estimate the distance between each pixel to its nearest object boundary. At 528, the computing system can calculate a distance transform for each pixel. The distance transform can be calculated based on the distance of each pixel to its nearest object boundary. At 530, the computing system can generate for each remaining pixel (those not corresponding to an object boundary) an energy value based on the distance transform for the pixel. For instance, the computing system can assign an energy value to each pixel based on the pixel's distance to a nearest object boundary. The energy level or value may increase the further a pixel is from its nearest object boundary. Thus, an object boundary may have an energy value of zero and each pixel proceeding from the object boundary to an instance center may have an increasing energy value relative to each preceding pixel.

In some examples, a machine learned model is utilized that is trained to predict an energy landscape for each image such that each component or region corresponds to a single object instance. For instance, deep learning using one or more neural networks may be used to produce a modified energy landscape where boundaries occur at a same energy level (e.g., zero).

In some examples, a machine learned model may be used to estimate the distance between each pixel and its nearest object boundary. For instance, the one or more neural networks trained to produce the modified energy landscape may be trained to generate boundaries at the same energy level, and also to generate for each remaining pixel an energy value representing the distance of each pixel to its nearest object boundary.

Figure 8:
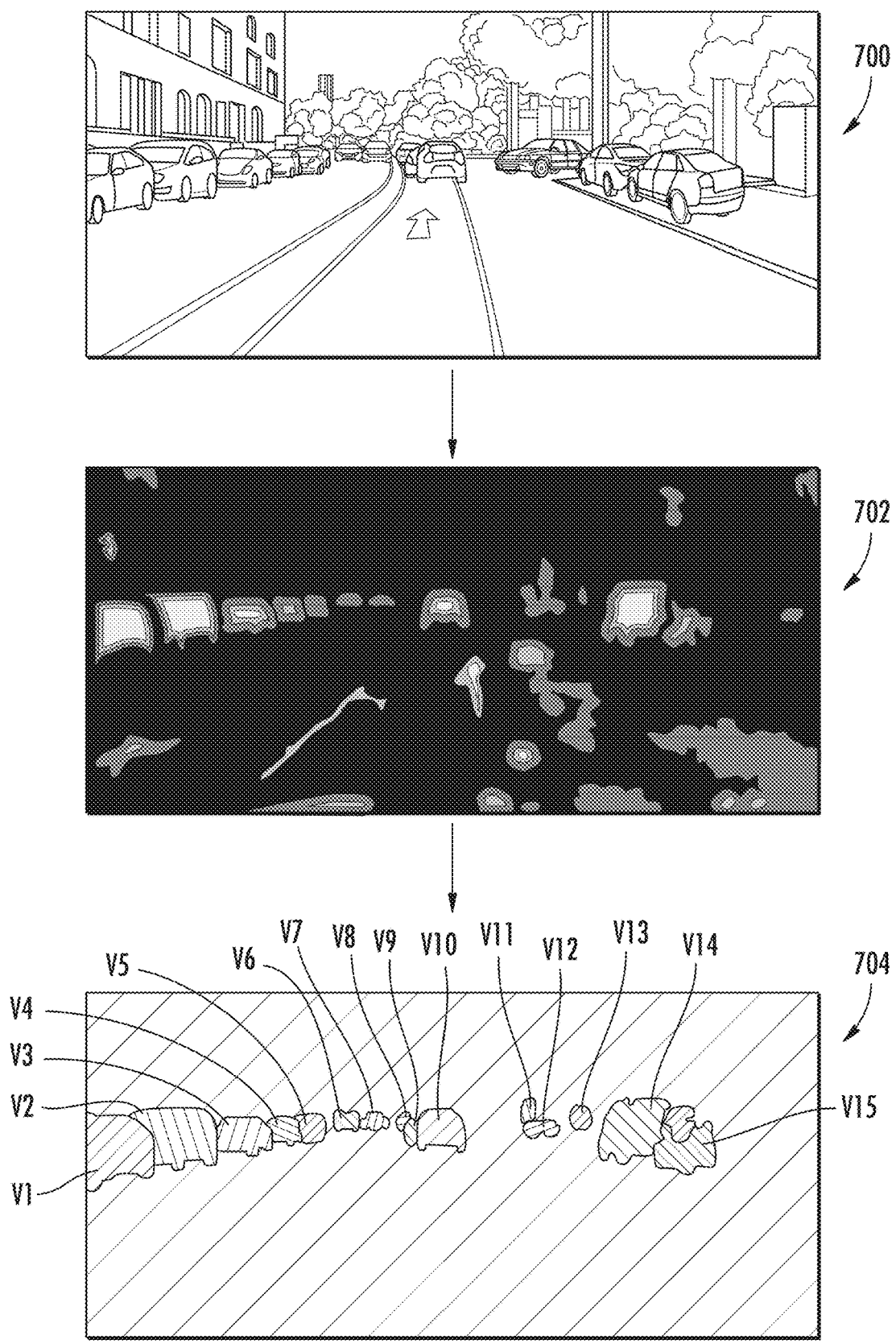
FIG. 8 depicts an example of an energy map and instance labels that can be generated for objects of an input image according to example embodiments of the present disclosure.

FIG. 8 is a block diagram depicting an example of generating an energy map and instance predictions for objects detected from sensor data including an image. In particular, FIG. 8 depicts image sensor data 700 collected by a sensor system, such as a sensor system including sensors 101 of an autonomous vehicle. While an example is described with respect to image sensor data, other sensor data such as RADAR sensor data or LIDAR sensor data may be used in a similar manner. Sensor data 700 depicts a street scene including a roadway, sidewalk, multiple automobiles, street signs, trees, sky, buildings, and other objects.

FIG. 8 additionally depicts an example energy map 702 generated from sensor data 700 using a machine learned model in accordance with example embodiments of the present disclosure. Each pixel of sensor data 700 is represented in energy map 702 according to its distance to a nearest object boundary. In FIG. 8, the pixels represented in energy map 702 are depicted using a colorized gray level to indicate the distance of each pixel to its nearest object boundary. Black pixels represent object boundaries, with progressively lighter pixels representing points at a greater distance from a nearest object boundary. In an example, a black pixel may correspond to an energy level of zero and a white pixel may correspond to an energy level of ten, representing the center of an object instance. Other energy levels may be used.

FIG. 8 additionally depicts an example of instance labels for the vehicle objects. More particularly, FIG. 8 depicts a graphical representation 704 identifying each instance label of an automobile from the original sensor data 700. In this example, the computing system predicts that there are fifteen instances or individual vehicles depicted in sensor data 700. Instance labels V1-V15 denote the fifteen vehicle instances identified from sensor data 700. For example, instance label V1 identifies a first group of pixels associated with a single object instance. Each pixel may be assigned the instance label V1 for example. Similarly, instance label V2 identifies a second group of pixels associated with a different single object instance. As described in more detail hereinafter, a connected components process such as seeding can be used to generate instance labels based on the energy map. For example, the system may select a pixel having an energy value that satisfies a threshold (e.g., is above the object boundary energy level) and assign to it a first instance label. The system may then assign to each connected pixel within one or more common object boundaries the first instance label. The system may then select a pixel outside of the one or more common object boundaries and assign to it a second instance label. Each remaining pixel within the object boundary with the selected pixel is assigned the second instance label. This process repeats until each pixel has been assigned an instance label.

Figure 9:
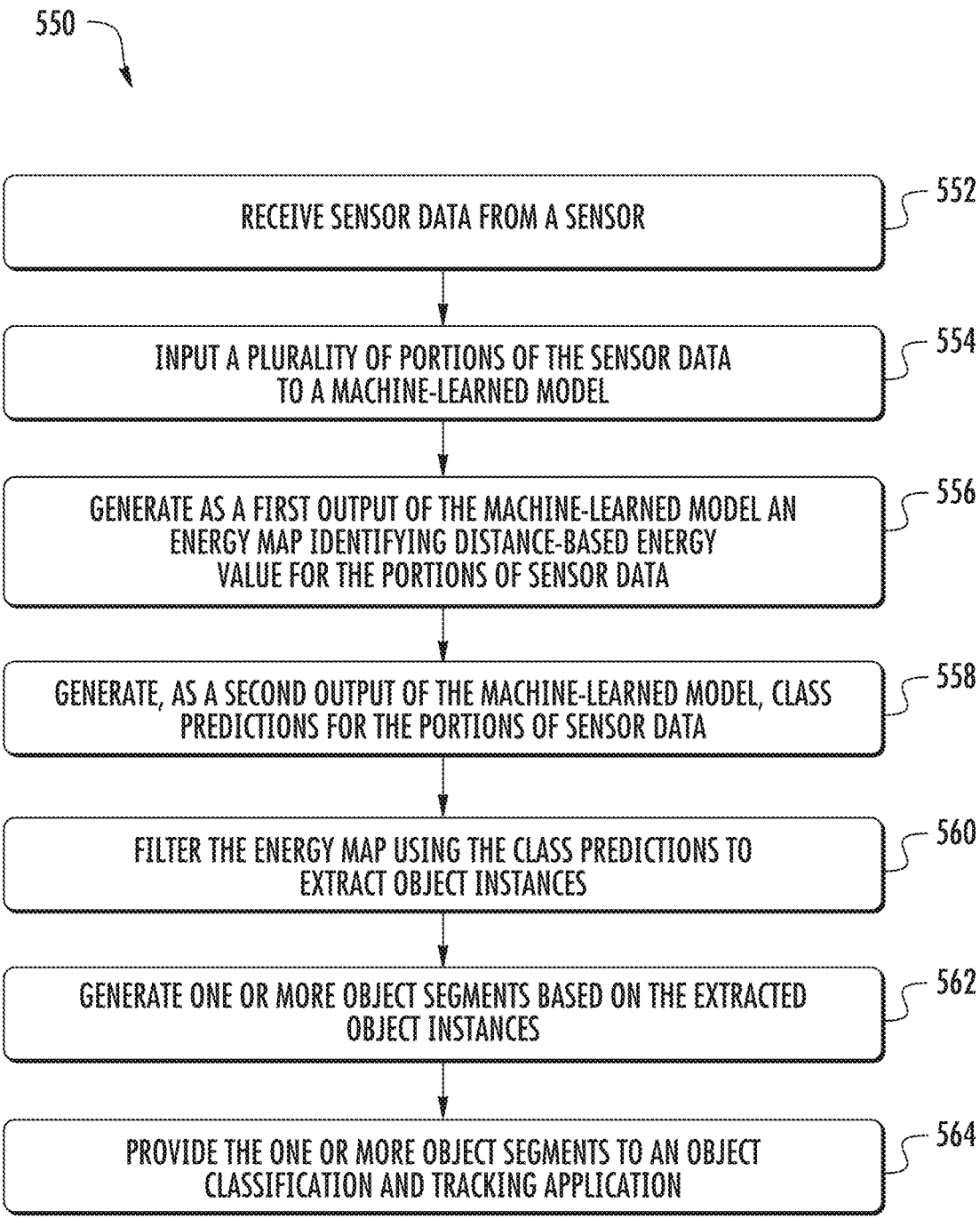
FIG. 9 depicts a flowchart diagram of an example process of object detection using a combined instance and class prediction machine-learned model according to example embodiments of the present disclosure.

FIG. 9 is a flowchart diagram depicting an example process 550 of distance-based object detection using instance predictions and class predictions for sensor data portions in accordance with example embodiments of the present disclosure. In example embodiments, process 550 may be performed by a distance-based object detector 302, as part of a segmentation component 206 within a perception system 103 of a vehicle computing system 102 or other computing system. Although discussion is provided with particular reference to autonomous vehicles, it will be appreciated that the disclosed process may be used for object segmentation by other computing systems such as user computing devices, robotic systems, and the like.

At 552, one or more computing devices within a computing system can receive sensor data from a sensor. At 554, the one or more computing devices can input a plurality of portions of the sensor data to a machine learned model. At 556, the one or more computing devices can generate as a first output of the machine learned model, an energy map identifying distance-based energy values for the portions of sensor data. The model may generate energy values representative of an energy level. In example embodiments, the operations at 552, 554, and 556 can be performed as earlier described with respect to 502, 504, and 506, respectively, of process 500. In some examples at 556, the computing system can generate an instance prediction for each sensor data portion.

At 558, the one or more computing devices can generate, as a second output of the machine learned model, class predictions for the portions of the sensor data. The class predictions may include for each portion of sensor data a predicted object type to which the sensor data portion is most closely associated.

At 560, one or more computing devices can filter the energy map using the class predictions to extract object instances. For example, the class predictions can be used to identify one or more regions of pixels corresponding to a particular object type within the energy map. Within the identified region(s) of pixels of the energy map, individual object instances can be extracted based on the energy values for each of the pixels within a region. By way of example, thresholding can be used within the identified region to identify object boundaries. A seeding or other connected components approach can then be used to group pixels within a common set of object boundaries. Each group of pixels can then be assigned a unique instance label or other instance identification. These groups of pixels having a unique instance label represent an extracted object instance.

Figure 10:
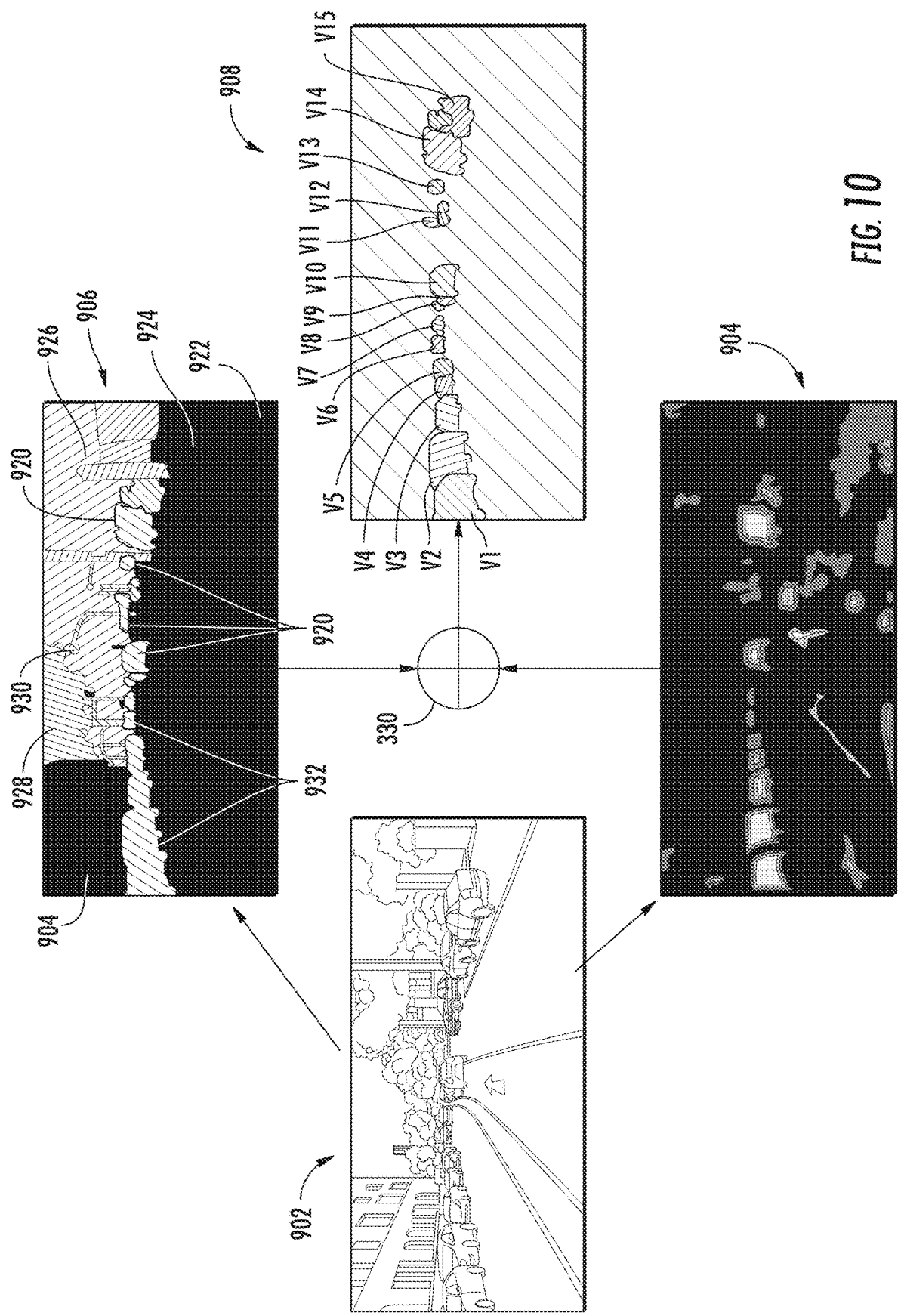
FIG. 10 depicts an example of an energy map, class predictions, and instance labels that can be generated for objects of an input image according to example embodiments of the present disclosure.

At 562, the one or more computing devices can generate one or more object segments based on the extracted object instances. At 564, the one or more computing devices can provide the one or more object segments to an object classification and tracking application FIG. 10 is a block diagram depicting an example of jointly performing semantic segmentation and instance segmentation to generate instance labels for portions of sensor data in accordance with example embodiments of the present disclosure. In particular, FIG. 10 provides a graphical depiction of image sensor data 902 collected by a sensor system, such as a sensor system including sensors 101 of an autonomous vehicle. While an example is described with respect to image sensor data, other sensor data such as RADAR sensor data or LIDAR sensor data may be used in a similar manner. Sensor data 902 depicts a street scene including a roadway with multiple vehicles including automobiles, bicycles, and motorcycles, as well as other objects such as trees, buildings, street signs, etc.

FIG. 10 additionally depicts an example energy map 904 and a representation 906 of class predictions generated from sensor data 902 using a machine learned model in accordance with example embodiments of the present disclosure. Energy map 904 may be generated from sensor data 902 as earlier described. Each pixel of sensor data 902 is represented in energy map 904 according to its distance to a nearest object boundary. The pixels are depicted using a colorized gray level to indicate the distance of each pixel to its nearest object boundary, with black pixels representing object boundaries and progressively lighter pixels representing points at a greater distance from a nearest object boundary.

Representation 906 depicts class predictions that may be generated using various types of machine learned models. The class predictions can be generated for each pixel or other sensor data portion based on the input sensor data 902. In this example, regions 932 include pixels having a vehicle class prediction. For instance, regions 932 include pixels that the machine learned model determines to be most closely associated with vehicles. Other classes are also represented, such as region 922 including pixels having a roadway class prediction, regions 924 including pixels having a sidewalk or building class prediction, regions 926 including pixels having a tree class prediction, regions 928 including pixels having a sky class prediction, and regions 930 including pixels having a street sign class prediction, etc. It will be appreciated that the class predictions depicted in FIG. 10 are provided by way of example only. The system may include any number and type of classifications according to the needs of a particular implementation.

FIG. 10 depicts an example of filtering the energy map 904 based on the class predictions depicted in representation 906 to generate instance labels for each of the pixels having a vehicle class prediction. FIG. 10 depicts a representation 908 including instance labels for the pixels having the vehicle class prediction. Specifically, fifteen individual vehicle object instances have been identified by filtering the energy map 904 based on class predictions in representation 906. Instance filter 330 can be used to extract individual object instances from a particular class of objects. Other filtering techniques may be used. Within regions 932, the pixels are grouped and assigned instance labels in association with their grouping. For example, instance representation 908 depicts a first set of pixels denoted by instance label V1. Each pixel in the first set is assigned the same instance label (e.g., V1) indicating that each of the pixels of the first set corresponds to the same vehicle object instance. Additional sets of pixels are denoted by instance labels V2-V15 indicating fourteen additional vehicle object instances detected from sensor data 902.

A thresholding technique based on the energy values of the pixels in regions 932 from energy map 904 may be used to determine an instance label for each pixel. For example, the system may be configured to determine that pixels having an energy value that does not meet the threshold are associated with object boundaries. Pixels having an energy value that meets the threshold may be grouped together with other pixels that are within a common set of object boundaries. A connected components technique may be used to assign to each pixel in the group the same instance label.

Figure 11:
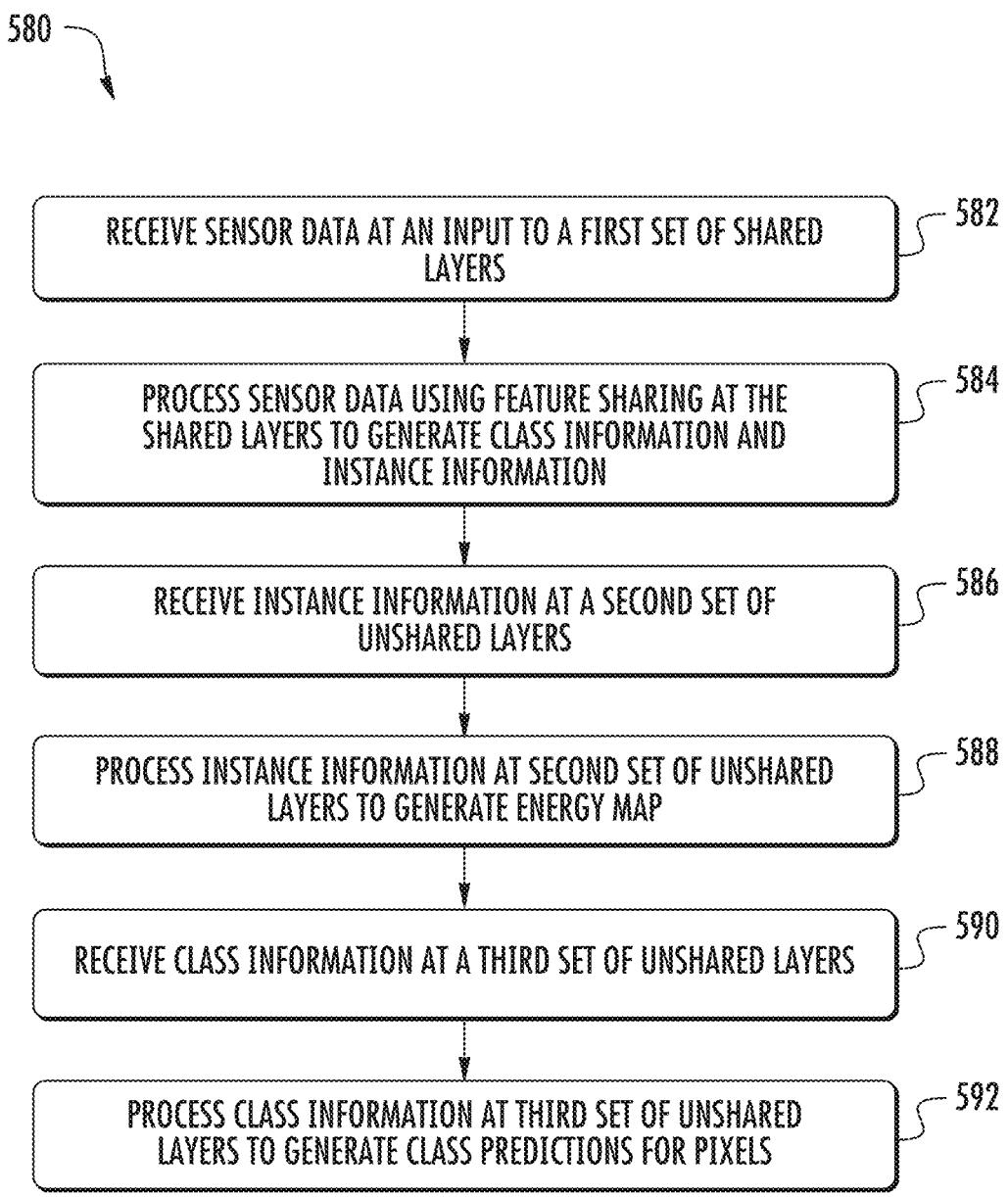
FIG. 11 depicts a flowchart diagram of an example process of object detection using a machine-learned model for joint class and instance segmentation.

FIG. 11 is a flowchart diagram depicting an example process 580 of distance-based object detection using a machine learned model for jointly generating class information and instance information from sensor data. The machine learned model can include unshared layers to generate class predictions and instance predictions (e.g., energy values) for the sensor data. In some examples, process 580 can be performed at 556 and/or 558 of process 550. In example embodiments, process 520 may be performed by a distance-based object detector 302, using a machine-learned model 324. More particularly, process 580 may be at least partially performed by neural network 404.

At 582, one or more computing devices within a computing system can receive sensor data as an input to a first set of shared layers of a machine learned model. At 584, the computing system can process the sensor data using feature sharing at the shared layers to generate class information and instance information related to the sensor data. The use of feature sharing to generate both class information and instance information may avoid shortcomings of approaches that utilize individual models in layers to generate such information. For example, the use of separate models may create a contradiction between class predictions generated using a first model and instance predictions generated using a different model.

At 586, the instance information generated by the first set of shared layers is received at a second set of unshared layers. The second set of unshared layers is configured to generate instance information such as an energy map including distance-based energy values for each of the pixels relative to an object boundary. At 588, the computing system processes the instance information at the second set of unshared layers to generate an energy map.

At 590, the computing system receives at a third set of unshared layers the class information generated by the first set of shared layers. The third set of unshared layers is configured to generate class information such as a class prediction for each of the pixels of the sensor data. At 592, the computing system processes the class information at the third set of unshared layers to generate a class prediction for each pixel of the sensor data.

Figure 12:
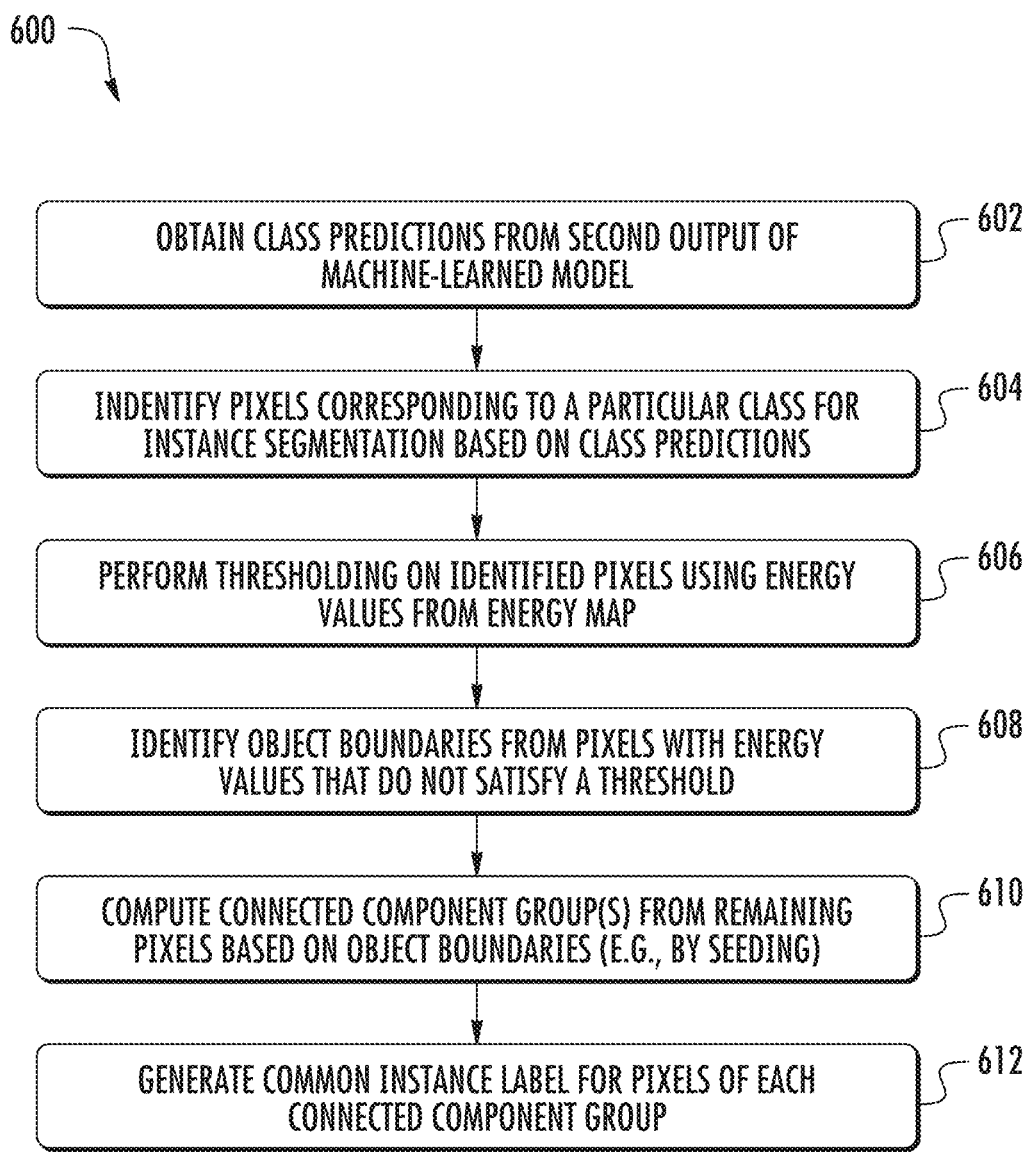
FIG. 12 depicts a flowchart diagram of an example process of extracting object instances from an energy map based on class prediction filtering.

FIG. 12 is a flowchart diagram depicting an example process 600 of distance-based object detection that includes combining instance predictions and class predictions in accordance with example embodiments of the present disclosure. In some examples, process 600 can be performed at 560 of process 550 at least as part of filtering an energy map using class predictions to extract object instances. In example embodiments, process 600 may be performed by a distance-based object detector 302, using a machine-learned model 324. More particularly, process 520 may be at least partially performed by dedicated instance segmentation layers 408 within a neural network 404 of a machine-learned model. In some example, process 520 may be at least partially performed by instance filter 330.

At 602, one or more computing devices within a computing system can obtain class predictions from a second output of a machine learned model. For example, 602 can include receiving class predictions from the third set of unshared layers of the machine learned model as described with respect to 592 of process 580. In some examples, 602 can include receiving class predictions 328 from a set of dedicated class segmentation layers 410 as depicted in FIG. 5.

At 604, the computing system can identify pixels corresponding to a particular class for instance segmentation based on the class predictions. For instance, the computing system can identify pixels having a first class prediction for which instance segmentation is to be performed. By way of example, the computing system can identify pixels having a vehicle class prediction or other object type prediction.

At 606, the computing system can perform thresholding on the identified pixels using the energy values from the energy map. For example, the computing system can determine for each pixel having the first class prediction whether the energy value of the pixel meets a threshold. An energy value may be considered to meet the threshold by equaling or exceeding a threshold value. In one example, 606 includes determining which pixels do not have an energy value that meets the threshold.

At 608, the computing system can identify object boundaries based on pixels having energy values that do not satisfy the threshold. For example, pixels having the first class prediction and an energy value that is below the threshold may be determined to correspond object boundaries.

At 610, the computing system can compute connected components groups from the remaining pixels based on the object boundaries. At 612, the computing system can generate a common instance label for pixels of each connected component group. In some examples, a seeding approach can be used at 610 and 612. By way of example, the computing system can select a pixel meeting the threshold level. The computing system can assign to the first pixel a first instance label or other identification. The computing system then can determine other pixels having the first class prediction that are also within a common set of object boundaries with the first pixel. Each of the pixels within a common set of object boundaries can be assigned a common instance label. Once all pixels within the first set of object boundaries are assigned the first instance label, the computing system can select a pixel outside of the first set of object boundaries. The pixel selected outside of the object boundaries can be assigned a second instance label. The process can continue for additional pixels within a set of object boundaries with the second selected pixel. This process is continued until all pixels have been assigned an instance label.

Figure 13:
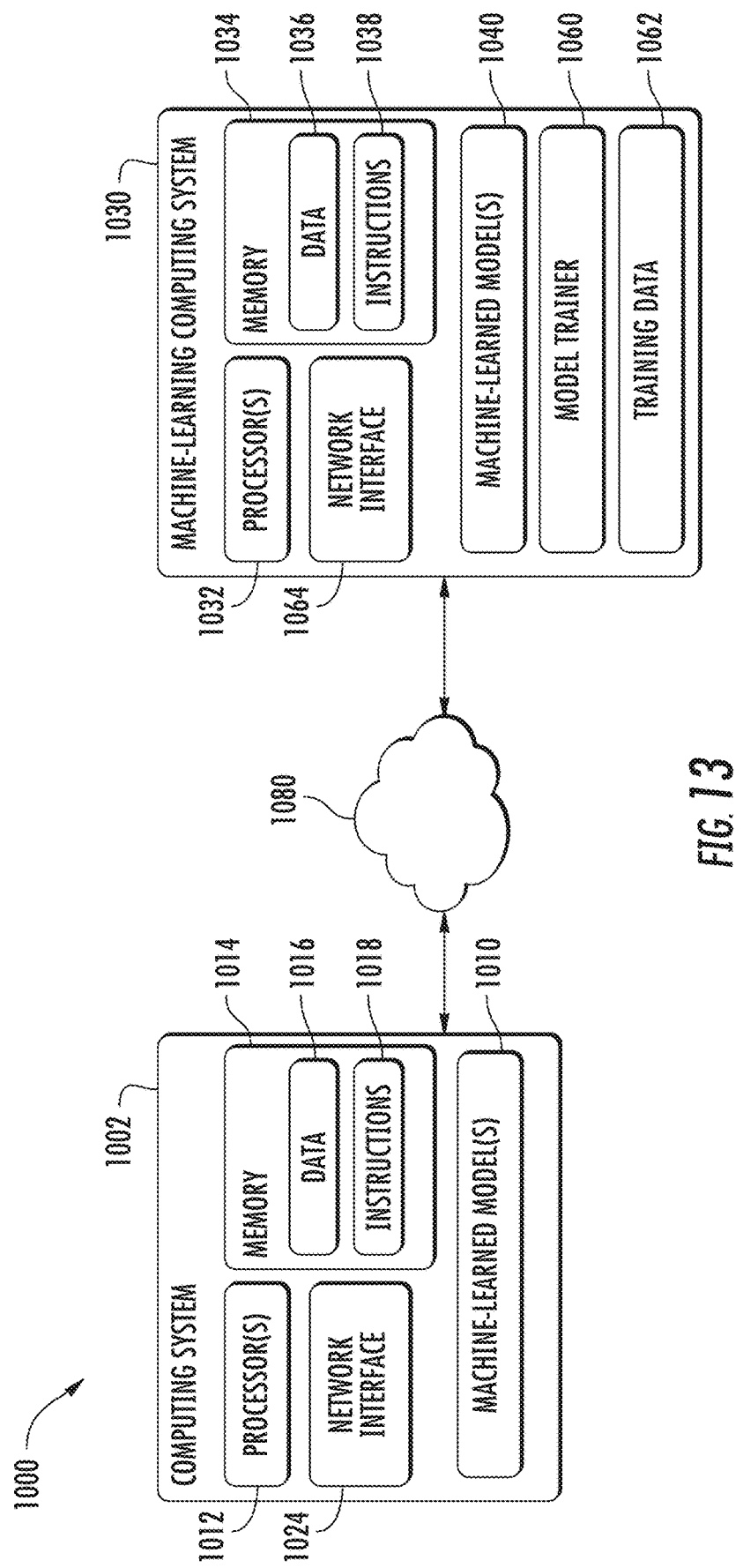
FIG. 13 depicts a block diagram of an example computing system according to example embodiments of the present disclosure.

FIG. 13 depicts a block diagram of an example computing system 1000 according to example embodiments of the present disclosure. The example computing system 1000 includes a computing system 1002 and a machine learning computing system 1030 that are communicatively coupled over a network 1080.

In some implementations, the computing system 1002 can perform object detection and segmentation, including instance and class prediction. In some implementations, the computing system 1002 can be included in an autonomous vehicle. For example, the computing system 1002 can be on-board the autonomous vehicle. In some embodiments, computing system 1002 can be used to implement vehicle computing system 102. In other implementations, the computing system 1002 is not located on-board the autonomous vehicle. For example, the computing system 1002 can operate offline to obtain imagery and perform object detection and segmentation. The computing system 1002 can include one or more distinct physical computing devices.

The computing system 1002 includes one or more processors 1012 and a memory 114. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can store data 116 that can be obtained, received, accessed, written, manipulated, created, and/or stored. The data 1016 can include, for instance, image or other sensor data captured by one or more sensors, machine-learned models, etc. as described herein. In some implementations, the computing system 1002 can obtain data from one or more memory device(s) that are remote from the computing system 1002.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processors 1012 cause the one or more processors 1012 to perform any of the operations and/or functions described herein, including, for example, generating machine-learned models, generated class predictions and instance predictions, generating object segments, etc.

According to an aspect of the present disclosure, the computing system 1002 can store or include one or more machine-learned models 1010. As examples, the machine-learned models 1010 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1002 can receive the one or more machine-learned models 1010 from the machine learning computing system 1030 over network 1080 and can store the one or more machine-learned models 1010 in the memory 1014. The computing system 1002 can then use or otherwise implement the one or more machine-learned models 1010 (e.g., by processor(s) 1012). In particular, the computing system 1002 can implement the machine-learned model(s) 1010 to detect objects by generating instance information and class information from sensor data.

The machine learning computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof. In some embodiments, machine learning computing system 1030 can be used to implement vehicle computing system 102.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, class predictions and instance predictions as described herein. In some implementations, the machine learning computing system 1030 can obtain data from one or more memory device(s) that are remote from the machine learning computing system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032.

For example, the memory 1034 can store instructions 1038 that when executed by the one or more processors 1032 cause the one or more processors 1032 to perform any of the operations and/or functions described herein, including, for example, training a machine-learned model to jointly generate instance and class information from sensor data, including generating an energy map that represents pixels based on their distance to an object boundary.

In some implementations, the machine learning computing system 1030 includes one or more server computing devices. If the machine learning computing system 1030 includes multiple server computing devices, such server computing devices can operate according to various computing architectures, including, for example, sequential computing architectures, parallel computing architectures, or some combination thereof.

In addition or alternatively to the machine-learned model(s) 1010 at the computing system 1002, the machine learning computing system 1030 can include one or more machine-learned models 1040. As examples, the machine-learned models 1040 can be or can otherwise include various machine-learned models such as, for example, neural networks (e.g., deep neural networks) or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1030 can communicate with the computing system 1002 according to a client-server relationship. For example, the machine learning computing system 1030 can implement the machine-learned models 1040 to provide a web service to the computing system 1002. For example, the web service can provide object segments in response to sensor data received from an autonomous vehicle.

Thus, machine-learned models 1010 can located and used at the computing system 1002 and/or machine-learned models 1040 can be located and used at the machine learning computing system 1030.

In some implementations, the machine learning computing system 1030 and/or the computing system 1002 can train the machine-learned models 1010 and/or 1040 through use of a model trainer 1060. The model trainer 1060 can train the machine-learned models 1010 and/or 1040 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1010 and/or 1040 based on a set of training data 1062. The training data 1062 can include, for example, ground truth data including instance labels and/or class labels for sensor data portions. The model trainer 1060 can be implemented in hardware, firmware, and/or software controlling one or more processors.

In some examples, the model trainer 160 can train a machine-learned model 1010 and/or 1040 using a ground truth modified watershed transform as a target as described herein. For example, the target may include for the modified watershed transform a common energy value for separating a plurality of bins corresponding to different object instances.

The computing system 1002 can also include a network interface 1024 used to communicate with one or more systems or devices, including systems or devices that are remotely located from the computing system 1002. The network interface 1024 can include any circuits, components, software, etc. for communicating with one or more networks (e.g., 1080). In some implementations, the network interface 1024 can include, for example, one or more of a communications controller, receiver, transceiver, transmitter, port, conductors, software and/or hardware for communicating data. Similarly, the machine learning computing system 1030 can include a network interface 1064.

The network(s) 1080 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 13 illustrates one example computing system 1000 that can be used to implement the present disclosure. Other computing systems can be used as well. For example, in some implementations, the computing system 1002 can include the model trainer 1060 and the training data 1062. In such implementations, the machine-learned models 1010 can be both trained and used locally at the computing system 1002. As another example, in some implementations, the computing system 1002 is not connected to other computing systems.

In addition, components illustrated and/or discussed as being included in one of the computing systems 1002 or 1030 can instead be included in another of the computing systems 1002 or 1030. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of detecting objects of interest comprising:
  receiving, by a computing system comprising one or more computing devices, sensor data from one or more sensors configured to generate sensor data associated with an environment;
  inputting, by the computing system, the sensor data to a machine-learned model configured to generate a class prediction and an instance prediction for each of a plurality of portions of the sensor data, the instance prediction for each of the plurality of portions of sensor data including an energy value based on a distance to at least one object boundary, the machine-learned model trained to generate a common energy value to represent the at least one object boundary;
  generating, by the computing system as outputs of the machine-learned model, an instance prediction and a class prediction corresponding to each of the plurality of portions of the sensor data;
  generating, by the computing system, one or more object segments based at least in part on the instance predictions and the class predictions; and
  training the machine-learned model using a ground truth modified watershed transform as a target, wherein the target includes for the ground truth modified watershed transform the common energy value for separating a plurality of bins, wherein each bin corresponds to a different instance prediction.

2. The computer-implemented method of claim 1, further comprising:
  generating, by the computing system, an instance label for each of the plurality of portions of the sensor data based on a corresponding class prediction and instance prediction.

3. The computer-implemented method of claim 2, wherein:
  the machine-learned model includes a neural network that uses feature sharing on the sensor data at a first portion of the neural network associated with both class prediction and instance prediction;
  the neural network includes a second portion that receives an output of the first portion of the neural network and determines the class prediction for each of the plurality of portions of the sensor data independently of the instance prediction; and
  the neural network includes a third portion that receives the output of the first portion of the neural network and determines the instance prediction for each of the plurality of portions of the sensor data independently of the class prediction.

4. The computer-implemented method of claim 3, wherein:
  the first portion of the neural network includes a plurality of shared first layers;
  the second portion of the neural network includes a plurality of unshared second layers configured to generate the class prediction for each of the plurality of portions of the sensor data; and
  the third portion of the neural network includes a plurality of unshared third layers configured to generate the instance prediction for each of the plurality of portions of the sensor data.

5. The computer-implemented method of 2, wherein the plurality of portions of the sensor data includes a first portion and generating an instance label for the first portion comprises:
  determining, by the computing system, that the first portion is associated with a first class prediction;
  in response to determining that the first portion is associated with the first class prediction, determining, by the computing system, that an energy value of the first portion satisfies a threshold; and
  in response to determining that the energy value of the first portion satisfies the threshold, assigning, by the computing system, to the first portion a first instance label.

6. The computer-implemented method of claim 5, further comprising:

determining, by the computing system, that each of one or more additional portions of the plurality of portions of sensor data is associated with the first class prediction and has an energy value that satisfies the threshold;

determining, by the computing system, that each of the one or more additional portions is within an object boundary corresponding to portions of the sensor data having energy values that do not satisfy the threshold; and in response to determining that each of the one or more additional portions is within the object boundary, assigning, by the computing system, to each of the one or more additional portions the first instance label.

7. The computer-implemented method of claim 6, wherein:

the common energy value for the at least one object boundary does not satisfy the threshold.

8. The computer-implemented method of claim 1, further comprising:

providing, by the computing system, the one or more object segments to an object classification and tracking application; and generating, by the computing system, one or more vehicle control signals for an autonomous vehicle based at least in part on an output of the object classification and tracking application.

9. The computer-implemented method of claim 1, wherein:

the sensor data is image data; and the machine-learned model comprises a convolutional neural network.

10. A computing system, comprising:

one or more processors;

a machine-learned model configured to receive sensor data representing an environment and in response to the sensor data to output an energy value in association with each of a plurality of portions of the sensor data, the machine-learned model trained to provide a common energy range to represent boundaries between objects in the environment; and one or more non-transitory computer-readable media that store instructions, that when executed by the one or more processors, cause the one or more processors to perform operations, the operations comprising:

providing, as input to the machine-learned model, sensor data representing the environment;

receiving, as output of the machine-learned model for each of a plurality of portions of the sensor data, a class prediction and an energy value, wherein the energy value is based on a distance of each portion relative to one or more object boundaries; and generating an instance label for each of the plurality of portions of sensor data based on a corresponding energy value and class prediction, wherein generating an instance label for each of the plurality of portions of the sensor data comprises:

determining whether each of the plurality of portions of the sensor data is associated with a first class prediction;

for portions of the sensor data that are associated with the first class prediction, identifying one or more object boundaries based on sensor data that corresponds to an energy value that does not satisfy a threshold; and for portions of the sensor data that are associated with the first class prediction and are within a common object boundary, generating a common instance label.

11. The computing system of claim 10, wherein:

the machine-learned model is configured to output an energy map including the energy value for each of the plurality of portions of the sensor data; and the energy map represents a plurality of objects in the environment.

12. The computing system of claim 10, wherein:

the sensor data is image data; and the machine-learned model comprises a convolutional neural network.

13. An autonomous vehicle, comprising:

a sensor system configured to generate sensor data of an environment external to the autonomous vehicle; and a vehicle computing system, comprising:

one or more processors; and one or more non-transitory computer-readable media that store instructions, that when executed by the one or more processors, cause the vehicle computing system to perform operations, the operations comprising:

providing sensor data from the sensor system as input to a machine-learned neural network including one or more shared layers configured to jointly determine instance information and classification information for each of a plurality of portions of the sensor data;

receiving, as a first output of one or more unshared first layers of the machine-learned neural network, an instance value for each of the plurality of portions of the sensor data based on the instance information from the one or more shared layers;

receiving, as a second output of one or more unshared second layers of the machine-learned neural network, a classification for each of the plurality of portions of the sensor data based on the classification information from the one or more shared layers; and generating an instance label for each of the plurality of portions of the sensor data based on a corresponding classification and instance value from the machine-learned neural network, the instance value for each of the plurality of portions of the sensor data comprises an energy value based on a distance from each portion to a nearest object boundary, wherein the plurality of portions includes a first portion and generating an instance label for the first portion comprises:

determining if the first portion is associated with a first classification;

in response to determining that the first portion is associated with the first classification, determining if an energy value of the first portion satisfies a threshold; and in response to determining that the energy value of the first portion satisfies the threshold, assigning to the first portion a first instance label.

14. The autonomous vehicle of claim 13, wherein the operations further comprise:

determining whether each of one or more additional portions of the plurality of portions is associated with the first classification and has an energy value that satisfies the threshold; and in response to determining that each of the one or more additional portions is associated with the first classification and has an energy value that satisfies the threshold, determining whether each of the one or more additional portions is within an object boundary corresponding to portions of the sensor data having energy values that do not satisfy the threshold.

15. The autonomous vehicle of claim 13, wherein the operations further comprise:
training the machine-learned neural network using a ground truth modified watershed transform as a target;
wherein the target includes for the ground truth modified watershed transform a single energy value that separates a plurality of bins, wherein each bin corresponds to a different instance label.

16. A computer-implemented method of detecting objects of interest comprising:
receiving, by a computing system comprising one or more computing devices, sensor data from one or more sensors configured to generate sensor data associated with an environment;
inputting, by the computing system, the sensor data to a machine-learned model configured to generate a class prediction and an instance prediction for each of a plurality of portions of the sensor data, the instance prediction for each of the plurality of portions of sensor data including an energy value based on a distance to at least one object boundary, the machine-learned model trained to generate a common energy value to represent the at least one object boundary, wherein the machine-learned model includes a neural network that uses feature sharing on the sensor data at a first portion of the neural network associated with both class prediction and instance prediction, the neural network includes a second portion that receives an output of the first portion of the neural network and determines the class prediction for each of the plurality of portions of the sensor data independently of the instance prediction, the neural network includes a third portion that receives the output of the first portion of the neural network and determines the instance prediction for each of the plurality of portions of the sensor data independently of the class prediction;
generating, by the computing system as outputs of the machine-learned model, an instance prediction and a class prediction corresponding to each of the plurality of portions of the sensor data;
generating, by the computing system, one or more object segments based at least in part on the instance predictions and the class predictions; and
generating, by the computing system, an instance label for each of the plurality of portions of the sensor data based on a corresponding class prediction and instance prediction.

* * * * *